United States Patent
Bitou et al.

(10) Patent No.: US 8,565,991 B2
(45) Date of Patent: Oct. 22, 2013

(54) WORKING FLUID MEDIUM TEMPERATURE CONTROL SYSTEM AND METHOD

(75) Inventors: Takayuki Bitou, Atsugi (JP); Koh Uchida, Sagamihara (JP); Katsuhiro Suda, Hadano (JP); Taisuke Ueda, Chigasaki (JP); Toru Inoue, Fujisawa (JP); Yoshikazu Takahashi, Ebina (JP); Hideyuki Kita, Atsugi (JP); Yohei Koike, Yokohama (JP); Nariaki Tazawa, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 475 days.

(21) Appl. No.: 13/017,868

(22) Filed: Jan. 31, 2011

(65) Prior Publication Data

US 2011/0190986 A1    Aug. 4, 2011

(30) Foreign Application Priority Data

Feb. 4, 2010    (JP) ................................. 2010-023367
Oct. 6, 2010    (JP) ................................. 2010-226579

(51) Int. Cl.
*G06F 7/00*    (2006.01)
*G06F 17/00*    (2006.01)
*G06F 19/00*    (2011.01)

(52) U.S. Cl.
USPC .......................................... 701/68; 74/473.1

(58) Field of Classification Search
USPC ................. 701/1, 4, 3, 9, 68; 180/4; 310/6, 5; 340/4; 74/473.1
See application file for complete search history.

(56) References Cited

U.S. PATENT DOCUMENTS

| | | | | |
|---|---|---|---|---|
| 6,257,364 | B1 * | 7/2001 | Parkhill et al. | 180/417 |
| 7,349,767 | B2 * | 3/2008 | Kuge et al. | 701/1 |
| 7,386,371 | B2 * | 6/2008 | Kuge et al. | 701/1 |
| 7,440,823 | B2 * | 10/2008 | Yamamura et al. | 701/1 |
| 7,573,227 | B2 | 8/2009 | Kasaoka et al. | |
| 7,663,273 | B2 * | 2/2010 | Shiino et al. | 310/59 |
| 7,982,347 | B2 * | 7/2011 | Shiino et al. | 310/68 B |
| 8,159,098 | B2 * | 4/2012 | Shiino et al. | 310/68 B |
| 2006/0108884 | A1 | 5/2006 | Shiino et al. | |
| 2011/0190986 | A1 * | 8/2011 | Bitou et al. | 701/41 |

FOREIGN PATENT DOCUMENTS

| | | | |
|---|---|---|---|
| DE | 198 59 340 A1 | 7/2000 | |
| DE | 19859340 A1 * | 7/2000 | F04B 23/02 |
| EP | 0 913 317 A2 | 5/1999 | |
| EP | 1 118 527 A1 | 7/2001 | |
| JP | 9-68173 A | 3/1997 | |
| JP | 2006-82568 A | 3/2006 | |
| JP | 2008-273361 A | 11/2008 | |

* cited by examiner

*Primary Examiner* — Thomas Black
*Assistant Examiner* — Robert Payne
(74) *Attorney, Agent, or Firm* — Foley & Lardner LLP

(57) ABSTRACT

A working fluid medium temperature control system comprises an actuator operable on a working fluid medium, a pump for the working fluid medium, a fluid passage structure for the working fluid medium, an electric motor drivingly connected to the pump, and a control unit for the electric motor, the control unit including an inverter and an inverter controller. The inverter and the electric motor are integrated in such a way that the inverter is in heat transfer communication with the electric motor. The fluid passage structure is in heat transfer communication with the inverter.

13 Claims, 14 Drawing Sheets

WORKING FLUID MEDIUM TEMPERATURE CONTROL SYSTEM AND METHOD

CROSS-REFERENCE TO RELATED APPLICATION(S)

The present application claims the benefit of Japanese patent application No. 2010-226579, filed Oct. 6, 2010, which claims the benefit of Japanese patent application No. 2010-23367, filed Feb. 4, 2010.

BACKGROUND OF THE INVENTION

1. Field of the Invention

The present invention relates to working fluid medium temperature control systems and methods.

2. Background Art

An electrohydraulic system, such as an electrohydraulic power-assist steering system, is known, which performs preheating of a working fluid medium.

In an example of such an electrohydraulic power-assist steering system for a vehicle, disclosed in JP 2008-273361, the main body of an electric motor is heated by turning on electricity even when rotation of the motor, which drives a hydraulic power steering pump, is stopped under static steering condition in the vicinity of neutral point while the vehicle is driving straight ahead. As a result, the heat generated by the electric motor is transferred to the working fluid medium passing through a fluid passage outside the motor, thereby to perform the preheating.

However, according to the technology disclosed in JP 2008-273361, the fluid passage is formed between the electric motor and a thin-walled sleeve surrounding the electric motor and meanders in such a way that the working fluid medium can stay in contact with the electric motor for a long time. With this passage structure, heat is quickly radiated from the working fluid medium because the heat is transmitted to the thin-walled sleeve exposed to the open air. As a result, the temperature of the working fluid medium changes greatly due to the repetition of heating and radiation cycle. Therefore, since the viscosity of the working fluid medium changes with the temperature change, it is possible that, with the same steering input, the power assist may differ substantially.

Therefore, there is a need for improving stability of operation of an actuator operable on a working fluid medium.

An object of the present invention is to provide a working fluid medium temperature control system, which can improve stability of operation of an actuator operable on the working fluid medium.

SUMMARY OF THE INVENTION

According to one aspect of the present invention, there is provided a working fluid medium temperature control system, comprising:
 a working fluid medium;
 an actuator operable on the working fluid medium;
 a pump for the working fluid medium;
 a fluid passage structure for the working fluid medium;
 an electric motor drivingly connected to the pump; and
 a control unit for the electric motor, the control unit including an inverter and an inverter controller;
 the inverter and the electric motor being integrated in such a way that the inverter is in heat transfer communication with the electric motor,
the fluid passage structure being in heat transfer communication with the inverter.

DETAILED DESCRIPTION OF THE INVENTION

Figure 1:
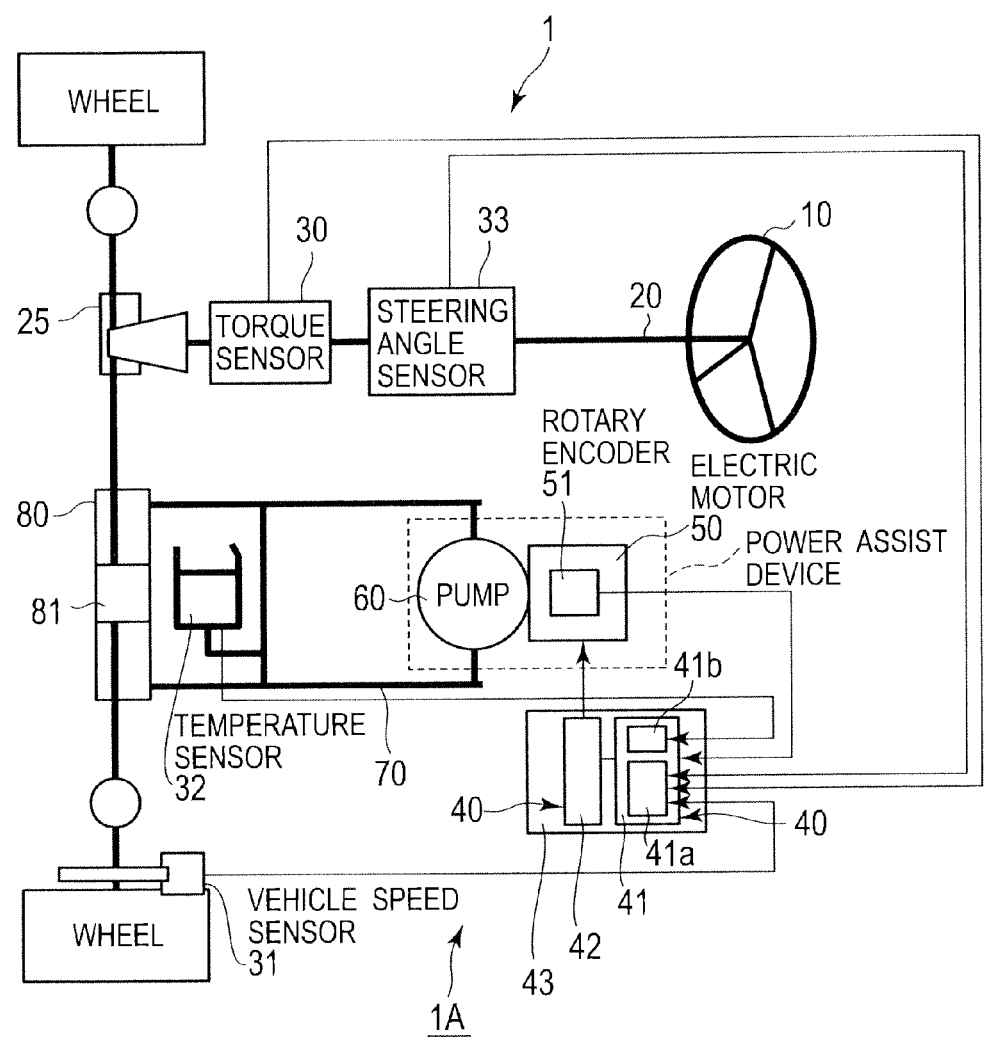
FIG. 1 is a diagram of a first embodiment of a working fluid medium temperature control system according to the present invention installed in an electrohydraulic power-assist steering system for an automobile.

Hereinafter, referring to the drawings, the embodiments according to the present invention are explained.

First Embodiment (Whole Composition)

Referring to FIG. 1, an automobile 1A comprises an electrohydraulic power-assist steering system 1. The automobile 1A comprises a steering gear. The steering gear includes a steering wheel 10, a steering shaft 20 and a rack 25. The steering wheel 10 transmits a steering input torque by the vehicle driver to the steering shaft 20. The steering shaft 20 transmits the steering input torque to a pinion gear that engages the rack 25. The rack 25 converts the steering input torque transmitted via the pinion gear into operation to steer the vehicle wheels.

In order to detect steering operation by the vehicle driver, a detector is installed on the steering gear. This detector may be called a steering operation detector. This embodiment employs, as the steering operation detector, a torque sensor 30 installed on the steering shaft 20. The torque sensor 30 senses or measures the steering input torque. In order to detect running state of the automobile 1A, this embodiment employs, as a vehicle's running state detector, a vehicle speed sensor 31. The vehicle speed sensor 31 senses or measures the number of pulses generated in proportion to the rotational speed of the vehicle wheel for measurement of the vehicle speed of the automobile 1A. In order to detect the temperature of working fluid medium, the embodiment employs, as a temperature detector, a temperature sensor 32. The temperature sensor 32 senses or measures the temperature of working fluid medium at an outlet port of a pump 60. The power-assist steering system 1 comprises a steering angle sensor 33. The steering angle sensor 33 is installed on the steering shaft 20 to sense or measure a steering rotation angle of the steering wheel 10.

The power-assist steering system 1 comprises a power assist device. The power assist device includes the pump 60, in the form of a hydraulic pump, and an electric motor 50. The electric motor 50 drives the pump 60, which in turn compresses and vomit out working fluid medium. The working fluid medium used in the power-assist steering system 1 is hydraulic fluid or oil. The electric motor 50 has a rotary encoder 51. The rotary encoder 51 measures an angular position of the electric motor 50.

Figure 2A:
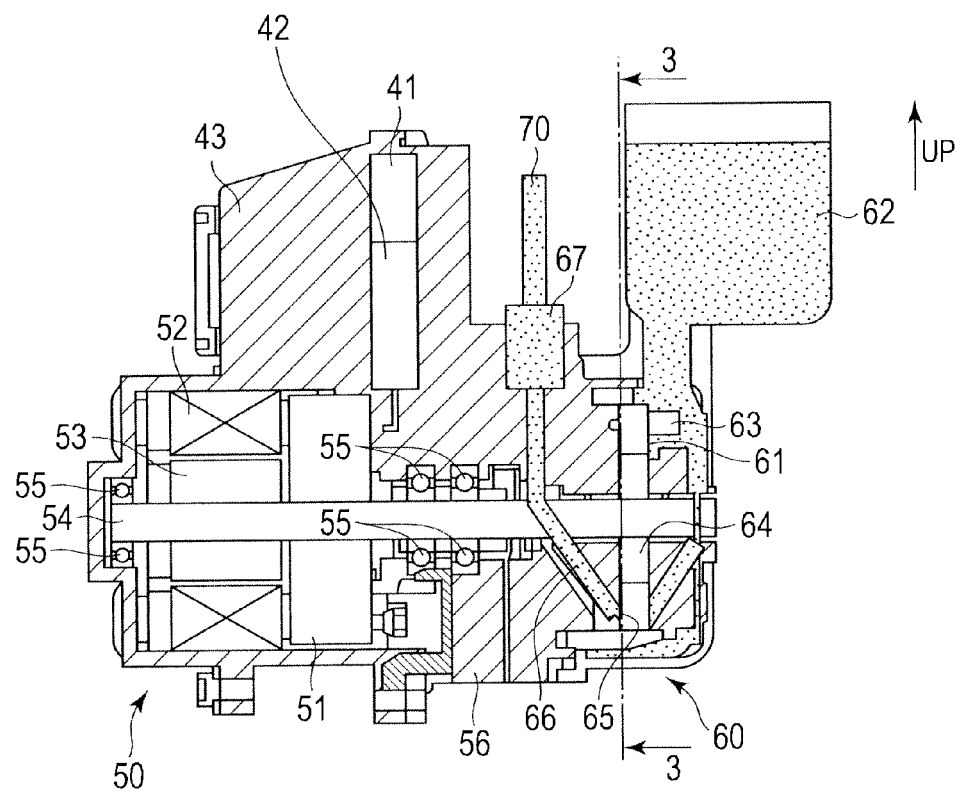
FIG. 2A is a side elevation of a power assist device shown in FIG. 1 with unnecessary parts removed to show a cross section taken through the line 2A-2A.

The steering gear comprises an actuator operable on the hydraulic fluid from a tank 62 (see FIG. 2A). The tank 62 contains the hydraulic fluid. In order to transmit a power assist to the rack 25, the actuator includes a power cylinder 80 and a piston 81. The piston 81 divides the interior of the power cylinder 80 in fluid tight manner into two fluid chambers. The power cylinder 80 is fluidly connected to the pump 60 through a pump housing external piping 70. The pump housing external piping 70 defines a pump housing external passage structure. The pump 60 is supplied with hydraulic fluid from the tank 62 and sends out the hydraulic fluid to the power cylinder 80. The hydraulic fluid discharged out of the power cylinder 80 returns to the tank 62.

As shown in FIG. 1, a control unit 40 for the electric motor 50 includes an inverter controller 41 and an inverter 42. The inverter controller 41 includes a steering/running state detection unit 41a and an assisting force command generation unit 41b. The inverter controller 41 issues commands. Under the commands of the inverter controller 41, the inverter 42 controls the electric motor 50. In order to store heat generated by the inverter 42, a heat storage element, in the form of a heat sink 43, includes a metallic plate that connects with the inverter 42.

The steering/running state detection unit 41a detects the state of steering operation by the vehicle driver based on an input from the torque sensor 30 and an input from the steering angle sensor 33 and it detects also the state of running of the automobile 1A based on an input from the vehicle speed sensor 31. Further, this steering/running state detection unit 41a calculates a basic power-assist and generates a basic power-assist command Ta* (see FIG. 4). The assisting force command generation unit 41b generates a q-axis current command Iq*, i.e., a target value of torque current Iq, and a d-axis current command Id*, i.e., a target value of magnetizing current Id, based on the basic power-assist command Ta* and an input from the temperature sensor 32. Based on the q-axis and d-axis current commands Iq* and Id*, a U-phase voltage Vu, a V-phase voltage Vv and a W-phase voltage Vw are applied to the inverter 42 that, in turn, controls the electric motor 50. The steering/running state detection unit 41a and the assisting force command generation unit 41b will be later described.

(Composition of Power Assist Device)

Figure 2B:
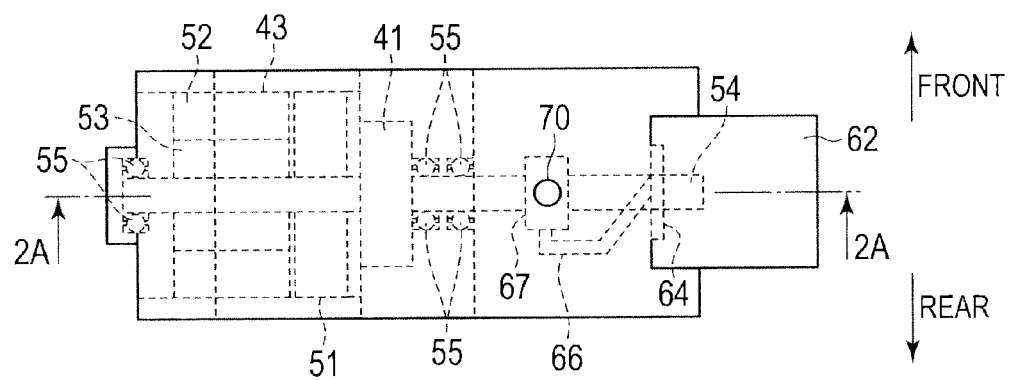
FIG. 2B is a top plan view of the power assist device shown in FIG. 2A.

Referring to FIGS. 2A and 2B, the power assist device includes the electric motor 50 and the pump 60. The electric motor 50 is a bidirectional dc motor driven by PWM control in the inverter 42.

The electric motor 50 has a rotary encoder 51. The rotary encoder 51 measures an angular position $\theta m$ of the motor 50 and outputs the result of measurement to the control unit 40. The control unit 40 includes the inverter controller 41. The control unit 40 gives a revolution speed (rpm) $\omega$ of the motor 50 by differentiating the angular position $\theta m$. The motor revolution speed $\omega$ is used as an input for feedback control of the motor 50. The inverter controller 41 outputs the motor control commands. In response to the motor control commands, the inverter 42 controls electric current passing through coils 52 of the motor 50. This causes magnetization of the coils 52, causing a rotor 53 and a rotating shaft 54 to rotate.

In order to quicken the radiation of heat to suppress the temperature rise, the inverter controller 41 is arranged above the electric motor 50, and the inverter 42 is arranged below the inverter controller 41. In order to quicken the radiation of heat from the inverter 42 and to store heat in a pump housing 56, the heat sink 43 is arranged in the neighborhood of the coils 52 as an integral part of the casing for the motor 50. When magnetizing current passes through the coils 52, a large amount of heat is generated. Preferably, the pump 60 is a well known gerotor pump. The pump 60, which will be described below in detail, includes an outer ring member, an outer rotor, and an inner rotor. The outer and inner rotors are indicated at 64 in FIGS. 2A and 2B. The inner rotor has at least one less tooth than the outer rotor. When the inner rotor is driven by the rotating shaft 54, it will drive the outer rotor which can freely rotate eccentrically with respect to the inner rotor, thus providing a series of decreasing and increasing volume fluid pockets by means of which hydraulic fluid pressure is created. It will be appreciated that any other appropriate type of pump for generating fluid pressure is within the scope of the present invention.

Figure 3:
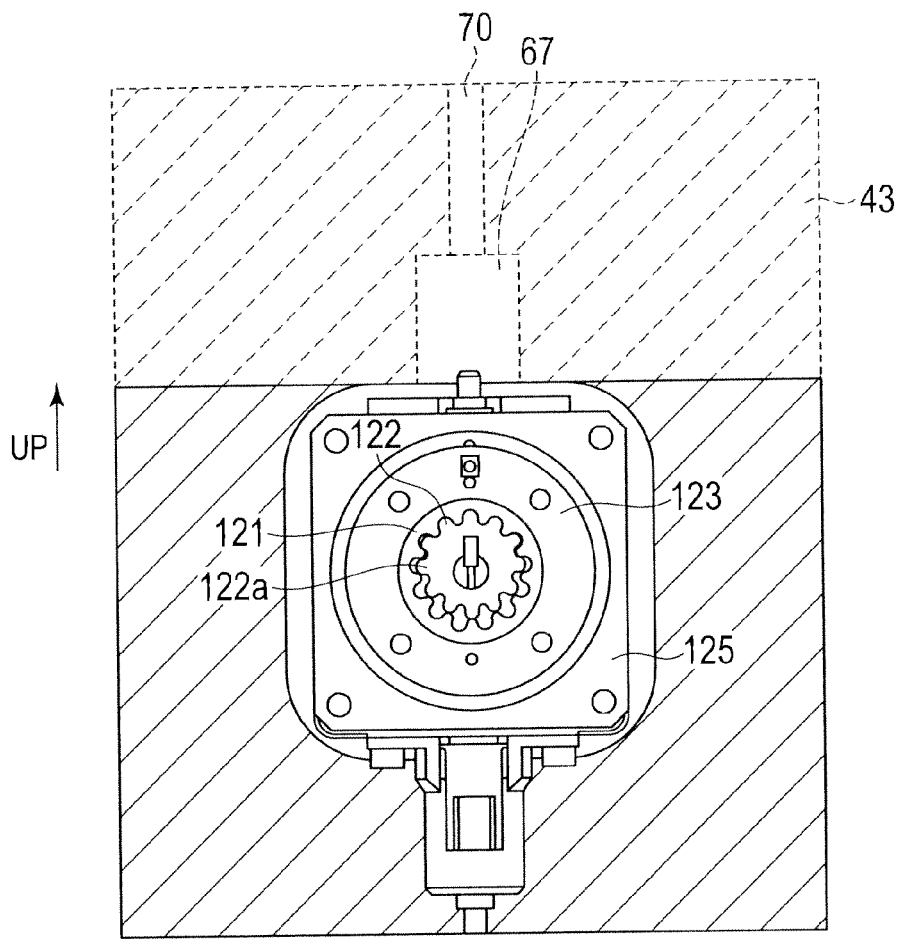
FIG. 3 is a cross section taken through the line 3-3 in FIG. 2A showing a pump for working fluid medium.

Referring to FIG. 3, the pump 60 is described. The pump 60 includes an outer ring member 123, an outer rotor 121, and an inner rotor 122. The inner rotor 122 is non-rotatably mounted to the rotating shaft 54 (see FIG. 2A). The outer ring member 123 is mounted within a housing 125. The outer rotor 121 is rotatably mounted within the outer ring member 123. The inner rotor 122, formed with outer teeth 122a, has one less tooth or two less teeth than the outer rotor 121, formed with inner teeth 121a so that when the inner rotor 122 is driven by the rotating shaft 54, it will drive the outer rotor 121 eccentrically with respect to the inner rotor 122, thus providing a series of decreasing and increasing volume fluid pockets by means of which fluid pressure is created.

Referring back to FIGS. 2A and 2B, the tank 62, which contains the hydraulic fluid, is installed above the pump 60. When the rotating shaft 54 drives the inner rotor of the pump 60, the hydraulic fluid within the tank 62 is admitted into the pump 60 via an intake 61 after passing through a check valve 63 located within a hydraulic fluid passage leading to the intake 61. Within the pump 60, the pressurized hydraulic fluid is created and discharged out of an outlet 65 into pump housing internal fluid passage structure 66 inside the pump housing 56. After passing through the pump housing internal fluid passage structure 66, the pressurized hydraulic fluid is discharged out of a port 67 into the pump housing external piping 70, which defines the pump housing external fluid passage structure outside the pump housing 56. Filling up the tank 62 with the hydraulic fluid is accomplished by inflow of hydraulic fluid from decreasing volume chamber of the power cylinder 80 during steering operation. The rotating shaft 54 is rotatably supported at four points by bearings 55.

According to the previously described first embodiment, the working fluid medium is in the form hydraulic fluid or oil, and the actuator in the form of power cylinder 80 is operable on the working fluid medium. The actuator, in the form of the power cylinder 80, and the pump 60 are fluidly connected by the pump housing internal fluid passage structure 66 outside the pump housing 56 and the pump housing external fluid passage structure defined by the pump housing external piping 70. The electric motor 50 is drivingly connected to the pump 60. The control unit 40 for the electric motor 50 includes the inverter 42 and the inverter controller 41. The control unit 40 will be described later in detail. Within the pump housing 56, the inverter 42 and the electric motor 50 are integrated in such a way that the inverter 42 is next to and in heat transfer communication with the electric motor 50. The fluid passage structure is close to and thus in heat transfer communication with the inverter 42. As shown in FIG. 2A, the pump housing internal fluid passage structure 66 inside the pump housing 56 and the pump housing external piping 70 outside the pump housing 56 provide fluid communication between the power cylinder 80, the pump 60 and the tank 62. Within the pump housing 56, the control unit 40, the electric motor 50 and the pump 60 are integrated, and the pump housing internal fluid passage structure 66 are on the discharge side of the pump 60. The pump housing internal fluid passage structure 66 extends through that portion of the pump housing 56 which is next to the inverter 42 of the control unit 40 in such a way that heat generated by the inverter 42 is transferred to the working fluid medium passing through the pump housing internal fluid passage structure 66. As a result of using the heat generated by the inverter 42, it becomes easy to raise the temperature of the working fluid medium toward a target temperature.

The electric motor 50 generates heat. This heat also is transferred to the working fluid medium passing through the pump housing internal fluid passage structure 66 to raise the temperature of the working fluid medium. The working fluid medium serves as a coolant. As a result, it is possible to efficiently cool down the inverter 42 and the electric motor 50.

As readily seen from FIG. 2A, according to the first embodiment, the control unit 40 and the tank 62 are on the same side of the rotating shaft 54 of the electric motor 50. In FIG. 2A, the inverter 42 and the inverter controller 41 are shown to indicate where the control unit 40 is. As a result, all of the parts can be put together in less space. Besides, the heat generated by the inverter 42 can be quickly transferred to the working fluid medium passing through the fluid passage structure 66. As a result, it is possible to efficiently cool down the inverter 42.

As mentioned previously, when it is driven by the rotating shaft 54, the inner rotor 122 will drive the outer rotor 121 eccentrically with respect to the inner rotor 122, thus providing a series of decreasing and increasing volume fluid pockets. The tank 62 is installed above the pump 60 to make it possible for the working fluid medium to promptly flow, by its own weight, down into the series of decreasing and increasing volume fluid pockets within the pump 60.

According to the first embodiment, the pump housing internal fluid passage structure 66 and the pump housing external piping 70 are between the inverter 42 and the tank 62. The heat generated by the inverter 42 and the electric motor 50 is transferred to the working fluid medium. As a result, it is possible to cool down the inverter 42 and the electric motor 50.

According to the first embodiment, the pump housing internal fluid passage structure 66 extends through that portion of the pump housing 56 which is close to the electric motor 50. The heat generated by the electric motor 50 is transferred to the working fluid medium, making it easy to raise the temperature of the working fluid medium and cool down the electric motor 50.

According to the first embodiment, within the pump housing 56, the pump housing internal fluid passage structure 66 extends through that portion of the pump housing 56 which surrounds the rotating shaft 54 of the electric motor 54. Therefore, within the pump housing 56, the pump housing internal fluid passage structure 66 can be efficiently arranged, and the heat of the electric motor 50 transmitted by the rotating shaft 54 can be efficiently supplied to the working fluid medium passing through the pump housing internal fluid passage structure 66. As a result, it is possible to promptly cool down the electric motor 50 by transferring heat of the electric motor 50 via the rotating shaft 54 and the pump housing internal fluid passage structure 66.

According to the first embodiment, the pump housing internal fluid passage structure 66 on the discharge side of the pump 60 is next to and thus in heat transfer communication with the control unit 40 and the electric motor 50. On the other hand, a pump housing internal fluid passage structure (the fluid passage(s) on the intake side of the pump 60) fluidly connecting the tank 62 and the pump 60 may be next to and thus in transfer heat communication with the control unit 40 and the electric motor 50

(Control Unit 40)

Figure 4:
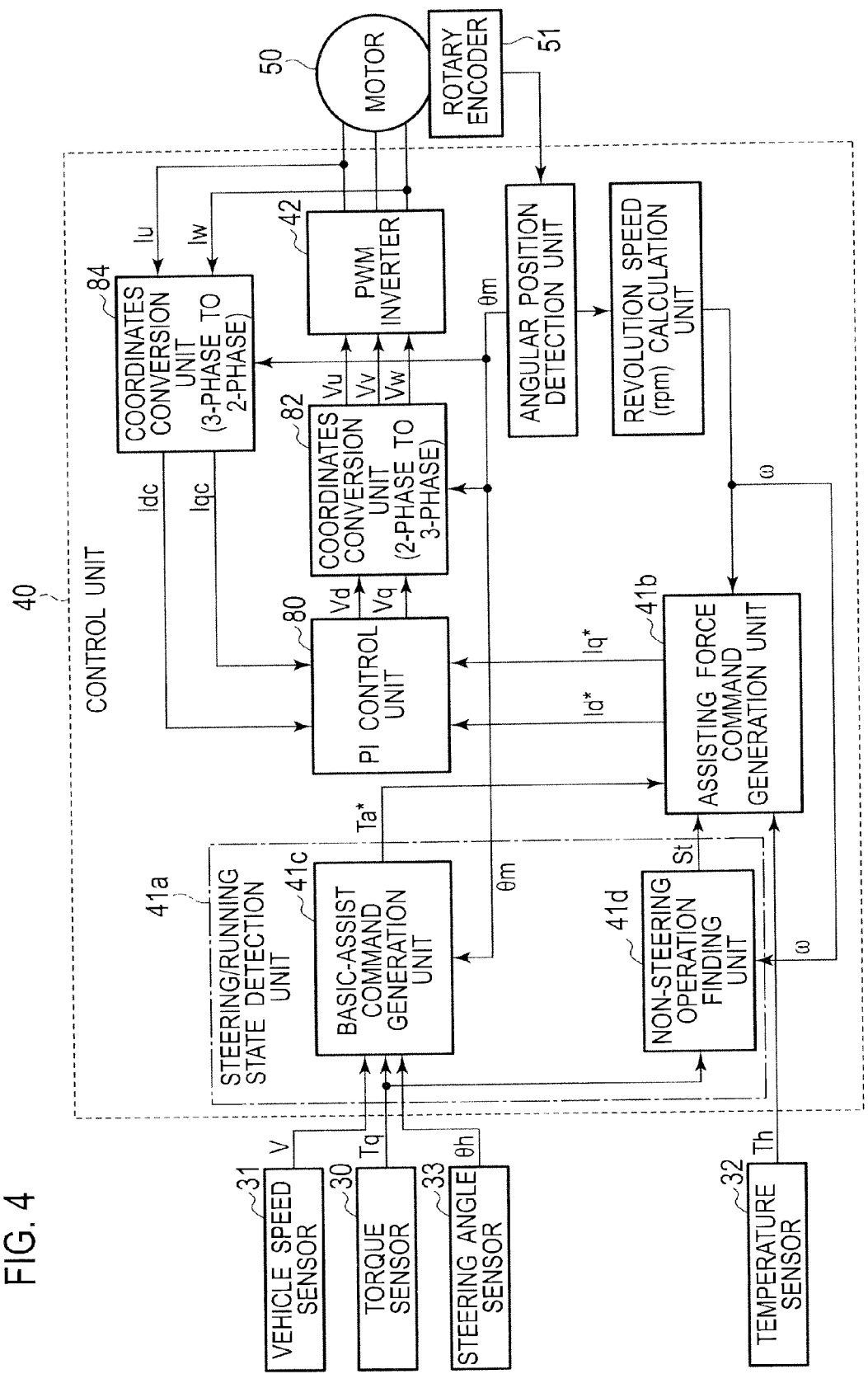
FIG. 4 is a control block diagram of a control unit.

FIG. 4 is a block diagram of the control unit 40 including the inverter controller 41. The inverter controller 41 starts with detecting steering operation by the vehicle driver, running state of the vehicle, and state of the system and ends with outputting a q-axis current command Iq* (namely, a target value of torque current) and a d-axis current command Id* (namely, a target value of magnetizing current). The inverter controller 41 includes a steering/running state detection unit 41a and an assisting force command generation unit 41b. The steering/running state detection unit 41a includes a basic-assist command generation unit 41c and a non-steering operation finding unit 41d. The basic-assist command generation unit 41c performs arithmetic operation based on inputs from the vehicle speed sensor 31, torque sensor 30, steering angle sensor 33 and an angular position detection unit connected with the rotary encoder 51. The non-steering operation finding unit 41d finds whether or not the vehicle driver performs steering operation based on the input from the torque sensor 30.

The vehicle speed sensor 31 senses or detects a vehicle speed V of the automobile 1A and outputs a vehicle speed indicative signal indicative of the detected vehicle speed V to the basic-assist command generation unit 41c. The steering angle sensor 33 senses or detects a steering angle θh and outputs a steering angle signal indicative of the detected steering angle θh to the basic-assist command generation unit 41c. The torque sensor 30 senses or detects a steering input torque Tq and outputs a signal indicative of the detected torque Tq to the basic-assist command generation unit 41c and also to the non-steering operation finding unit 41d. A temperature sensor 32 senses or detects temperature of hydraulic fluid Th at the outlet 65 of the pump 60 and outputs a signal indicative of the detected hydraulic fluid temperature Th to the assisting force command generation unit 41b. The angular position detection unit detects an angular position θm of the electric motor 50 based on an input from the rotary encoder 51 within the electric motor 50 and outputs an angular position signal indicative of the detected angular position θm to the basic-assist command generation unit 41c and a revolution speed (rpm) calculation unit. The revolution speed (rpm) calculation unit converts the angular position θm into a revolution speed ω (rpm) by, for example, differentiating the angular position θm and outputs a revolution speed signal indicative of the calculated revolution speed ω to the non-steering operation finding unit 41d and the assisting force command generation unit 41b. As will be appreciated from the description that follows, the angular position θm is used as inputs for the feedback control of torque generated by the electric motor 50.

Next, the basic-assist command generation unit 41c of the steering/running state detection unit 41a performs arithmetic operation to give a basic power-assist command Ta*, which is indicative of a target value of a basic power-assist requested by the steering power-assist control, with respect to the steering input torque Tq and vehicle speed V. Here, the steering angle θh and the angular position θm of the motor 50 are taken into consideration to find the basic power-assist command Ta*. The basic-assist command generation unit 41c outputs the basic power-assist command Ta* to the assisting force command generation unit 41b. The revolution speed ω and the hydraulic fluid temperature Th are fed to the assisting force command generation unit 41b.

The non-steering operation finding unit 41d sets a non-steering operation flag St (St=1) when it finds non-steering operation and resets the non-steering operation flag St (St=0) when it fails to find the non-steering operation. It outputs the non-steering operation flag St to the assisting force command generation unit 41b.

The assisting force command generation unit 41b sets a temperature control range around a predetermined standard temperature Tg using, for example, a predetermined map. It calculates a target temperature for control within the temperature control range. It performs arithmetic operation based on an input St from the non-steering operation finding unit 41d, an input Th from the temperature sensor 32, an input Ta* from the basic-assist command generation unit 41c, and an input ω from the revolution speed (rpm) calculation unit and generates a q-axis current command Iq*, i.e., a target value of torque current Iq for the electric motor 50, and a d-axis current command Id*, i.e., a target value of magnetizing current Id for the electric motor 50 in such a way that the electric motor 50 can generate torque required to accomplish the basic power-assist command Ta* and heat to raise the temperature of hydraulic fluid to accomplish the target temperature within the temperature control range. The q-axis and d-axis current commands Iq* and Id* are fed to a PI control unit 80. An actual value q-axis current Iqc, i.e., an actual value of torque current Iq, and an actual d-axis current Idc, i.e., an actual value of magnetizing current Id, are fed to the PI control unit 80. The PI control unit 80 gives a q-axis voltage command Vq, i.e., a target value of q-axis voltage, and a d-axis voltage command Vd, i.e., a target value of d-axis voltage, based on the q-axis current command Iq*, actual q-axis current Iqc, d-axis current command Id* and d-axis actual current Idc in such a way that a difference between the q-axis current command Iq* and the actual q-axis current Iqc and a difference between the d-axis current command Id* and the actual d-axis current Idc approach zero. The q-axis voltage command Vq and d-axis voltage command Vd are fed to a 2-phase to 3-phase coordinates conversion unit 82, which forms a part of a current control unit for the PWM inverter 42. The coordinates conversion unit 82 converts the q-axis voltage command Vq and d-axis voltage Vd command into a U-phase voltage command Vu, a V-phase voltage command Vv, and a W-phase voltage command Vw by using the angular position θm of the motor 50. Based on the U-phase voltage command Vu, V-phase voltage command Vv, and W-phase voltage command Vw, drive signals Du, Dv and Dw for the PWM inverter 42 are generated. In accordance with the drive signals Du, Dv and Dw, the PWM inverter 42 controls a U-phase current Iu fed to the coil of a U-phase in the electric motor 50, a V-phase current Iv fed to the coil of a V-phase in the electric motor 50, and a W-phase current Iw fed to the coil of a W-phase in the electric motor 50.

Among the three-phases currents Iu, Iv and Iw outputted from the PWM inverter 42 to the electric motor 50, the U-phase current Iu of two phases and the W-phase current Iw of two phases are sensed or detected by sensors, not shown. A filter processor removes a high frequency component corresponding to the detected respective currents Iu and Iw and extracts the respective phase currents Iu and Iw as physical quantity.

A 3-pahse to 2-phase coordinates conversion unit 84 is provided to calculate an actual q-axis current Iqc and a d-axis current Idc based on the phase currents Iu and Iw extracted by the filter processor. The actual q-axis and d-axis currents are fed to the PI control unit 80.

(Operation)

Next, the operation is described.

(How to Find Non-Steering Operation)

Figure 5:
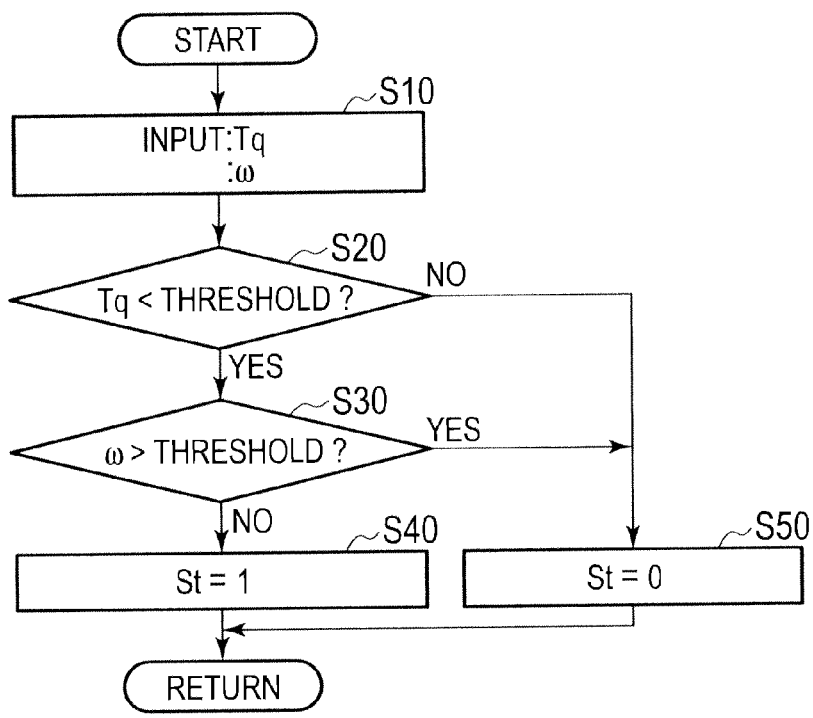
FIG. 5 is a flowchart showing how a non-steering operation finding unit shown in FIG. 4 finds a non-steering operation of the power-assist steering system.

Referring to FIG. 5, the flowchart shows how the non-steering operation finding unit 41d finds whether or not steering operation is performed by the vehicle driver. Turning on the ignition switch of the automobile 1A initiates repetition of execution of the flowchart shown in FIG. 5. The execution of the flowchart begins when the control unit 40 inputs by reading operation, as vehicle state indicative signals, the steering input torque Tq and the revolution speed (rpm) ω of the motor 50 (step S10). The control unit 40 finds whether or not the steering input torque Tq is less than a predetermined torque threshold (step S20). When, at step S20, it finds that the steering input torque Tq is less than the predetermined torque threshold, the control unit 40 finds whether or not the revolution speed ω of the electric motor 50 is greater than a predetermined threshold of the motor revolution speed (namely, a predetermined motor revolution speed threshold). When, at step S30, it finds that the revolution speed ω of the electric motor 50 is not greater than the predetermined motor revolution speed threshold, the control unit 40 sets a non-steering operation flag St by setting "1" as the flag St (step S40), indicating that the vehicle driver does not operate the steering. When, at step S30, it finds that the revolution speed ω is greater than the predetermined motor revolution speed threshold, the control unit 40 resets the non-steering operation flag St by setting "0" as the flag St (step S50), indicating that the vehicle driver operates the steering. After the step S40 or S50, the control unit 40 repeats the execution of this flowchart.

(How to Control Motor)

Figure 6:
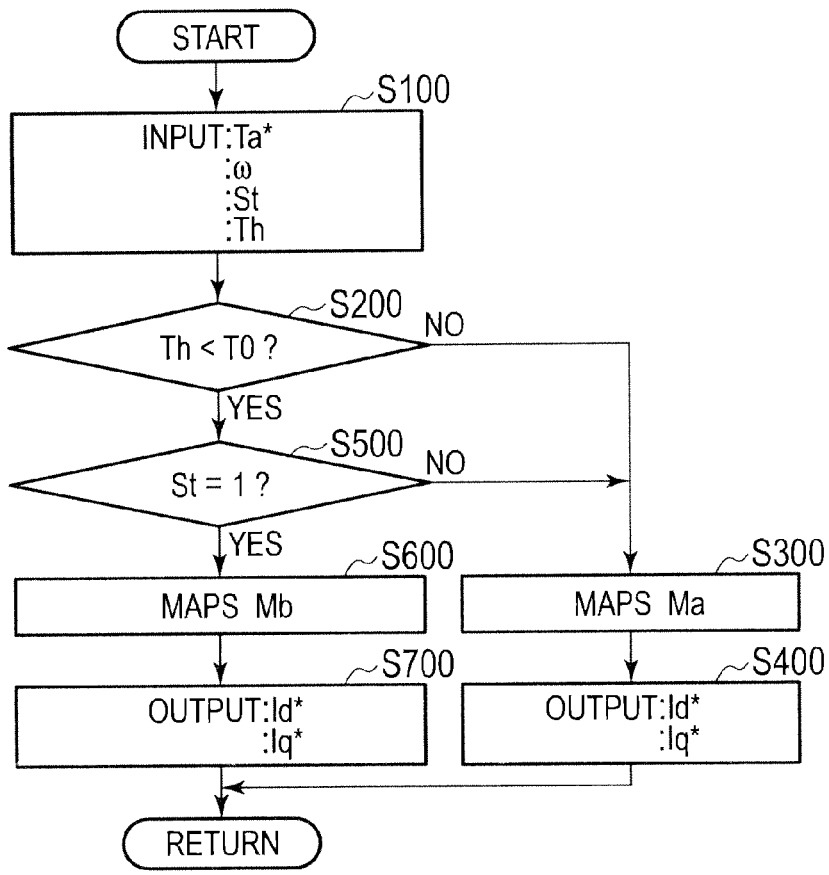
FIG. 6 is a flowchart showing how the control unit controls the electric motor according to the first embodiment.

Referring to FIG. 6, the flowchart shows how the assisting force command generation unit 41b performs arithmetic operation to give the q-axis and d-axis current commands Iq* and Id*. Turning on the ignition switch of the automobile 1A initiates repetition of execution of the flowchart shown in FIG. 6. The execution of the flowchart begins when the control unit 40 inputs, by reading operation, the basic power-assist command Ta*, revolution speed (rpm) ω, non-steering operation flag St and hydraulic fluid temperature Th (step S100).

Next, the control unit 40 finds whether or not the hydraulic fluid temperature Th is less than the lowest temperature value T0 of an area where viscosity change rate with respect to hydraulic fluid temperature is not comparatively large, for example, an area higher than 0° C. (step S200). When, at step S200, it finds that the hydraulic fluid temperature Th is not less than the lowest temperature value T0, the control unit 40 uses maps Ma to find a target value of q-axis current Iq* and a target value of d-axis current Id* against the revolution speed (rpm) ω (step S300) because, under this condition, the viscosity change rate with respect to hydraulic fluid temperature is so small that it is not necessary to execute control for raising the hydraulic fluid temperature. And, the control unit 40 outputs the target value of q-axis current Iq* and the target value of d-axis current Id*, which have been found using the maps Ma, to the PWM inverter 42 (step S400).

When, at step S200, it finds that the hydraulic fluid temperature Th is less than the lowest temperature value T0, the control unit 40 finds whether or not the non-steering operation flag St is "1" (step S500). When, at step S500, it finds that the non-steering operation flag St is not "1", the control unit 40 makes a shift to the step S300 because, under this condition, the electric motor 50 is activated, an increase in the hydraulic fluid temperature is expected by heat generated by the electric motor 50, and the control to raise the hydraulic fluid temperature is not necessary.

On the other hand, when, at step S500, it finds that the non-steering operation flag St is "1", the control unit 40 uses maps Mb to find a target value of q-axis current Iq* and a target value of d-axis current Id* against the revolution speed (rpm) ω because, under this condition, the electric motor 50 is not activated so that the control to raise the temperature is necessary (step S600). And, the control unit 40 outputs the target value of q-axis current Iq* and the target value of d-axis current Id*, which have been found using the maps Mb, to the PWM inverter 42 (step S700).

After the step S400 or S700, the control unit 40 repeats the execution of this flowchart for motor control.

(Qualities of Maps Ma and Maps Mb)

Figure 7A:
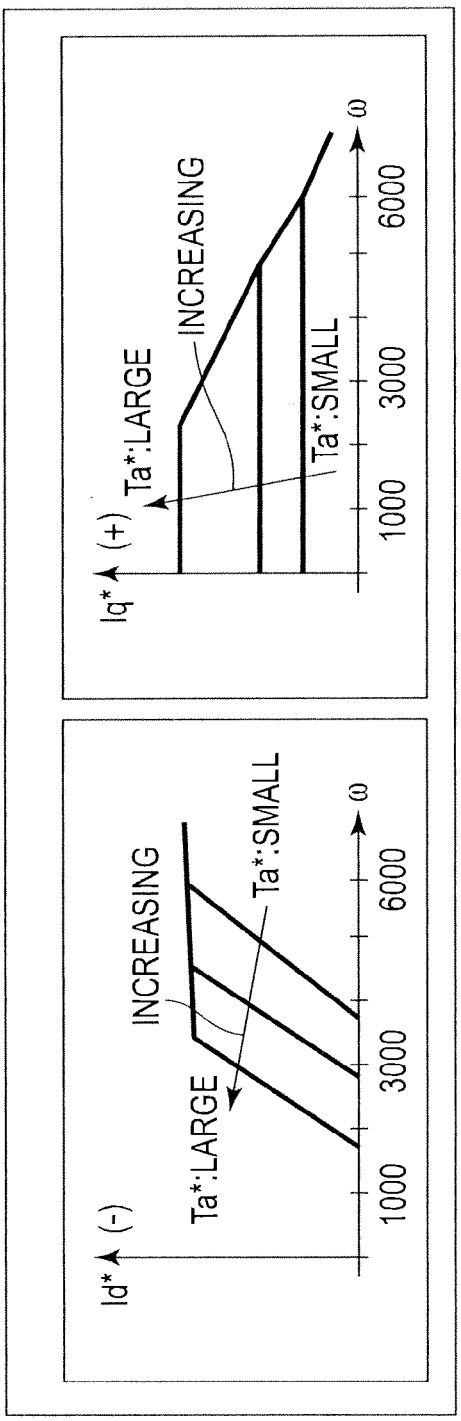
FIG. 7A shows maps Ma, which are selected for use in rendering the electric motor operable to generate torque.
Figure 7B:
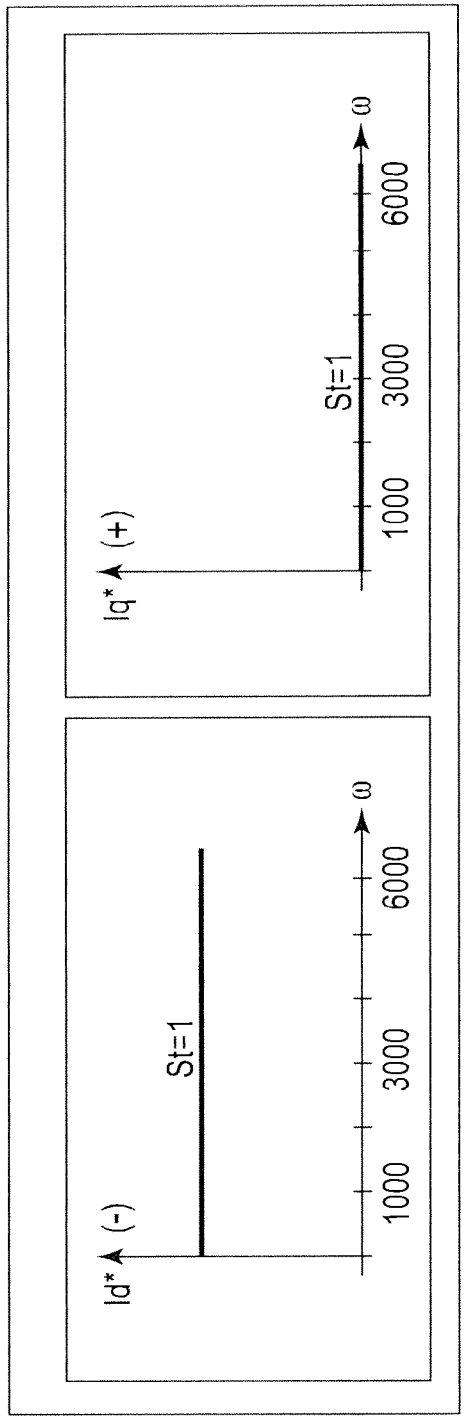
FIG. 7B shows maps Mb, which are selected for use in rendering the electric motor operable to generate heat.

Referring to FIGS. 7A and 7B, the qualities of maps Ma and maps Mb are described.

As mentioned before, the maps Ma for usual power-assist control include an Iq*(ω, Ta*) map having a set of lines, each showing varying of the target value of q-axis current Iq* with different values of revolution speed (rpm) ω of the motor 50, which are prepared for different values of basic power-assist command Ta*. The maps Ma also include an Id*(ω, Ta*) map having a set of lines, each showing varying of the target value of d-axis current Id* with different values of revolution speed (rpm) ω of the motor 50, which are prepared for different values of basic power-assist command Ta*. And, the maps Mb for hydraulic fluid temperature control include an Iq*(ω) map which sets a zero as the target value of q-axis current Iq* with different values of revolution speed (rpm) ω of the motor 50 when the steering operation flag St is set (St=1) and the basic power-assist command Ta* is zero (Ta*=0). The maps Mb also include an Id*(ω) map which sets the maximum value of d-axis current as the target value of d-axis current Id* with different values of revolution speed (rpm) ω of the motor 50 when the steering operation flag St is set (St=1) and the basic power-assist command Ta* is zero (Ta*=0).

The maps Ma, which are not tailored to raising the hydraulic fluid temperature and maintaining same, are used for the control unit 40 to find the target value of q-axis current Iq* for the motor 50 to generate torque in accordance with the basic power-assist command Ta* in such a way that the target value of q-axis current Iq* is proportional to the basic power-assist command Ta*. The motor 50 shows the quality of efficiency such that the higher the q-axis current Iq is, the more the area of revolution speed (rpm) ω, where the motor 50 shows low efficiency, shifts in a direction of lowering revolution speed (rpm) ω. Induced electromotive force grows when the revolution speed (rpm) ω of the electric motor 50 rises, thus causing a drop in power-assist torque. The d-axis current Id is a magnetizing current passing through stator coils to prevent such drop in power-assist torque. Thus, the target value of d-axis current Id* is proportional to the revolution speed (rpm) ω of the electric motor 50. The larger the basic power-assist command Ta* is, the more the revolution speed (rpm) ω, at which the d-axis current begins to pass through the stator coils, shifts in a direction of lowering revolution speed (rpm) ω.

The maps Mb, which are tailored to quickly raising the hydraulic fluid temperature and maintaining same, are used when the control unit 40 finds that the non-steering operation flag St is set (St=1), indicating that the steering is not operated. The target value of d-axis current Id* is maximized regardless of the revolution speed (rpm) of the motor 50 to quickly raise the hydraulic fluid temperature.

According to this embodiment, by switching the maps from the maps Ma to maps Mb, an appropriate target value of d-axis current Id* can be easily found according to the state of the hydraulic fluid temperature.

(Function)

Figure 8:
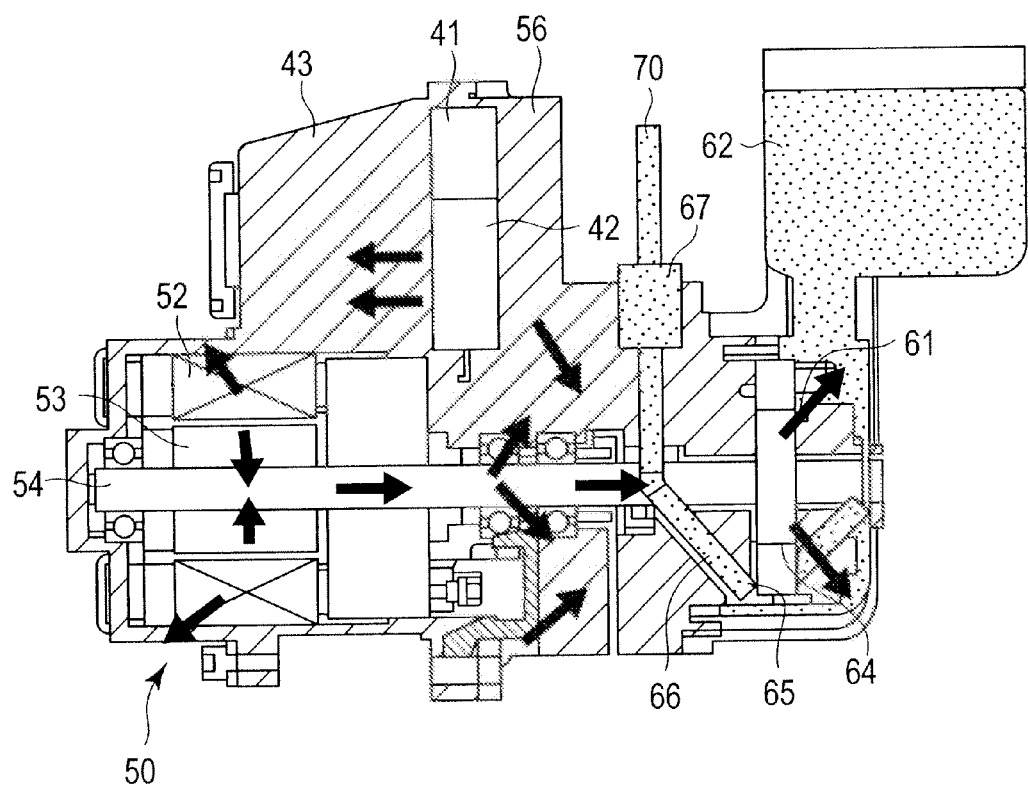
FIG. 8 is a block diagram showing channels of heat transfer through the power assist device shown in FIGS. 2A and 2B.

Referring to FIG. 8, channels of heat transfer to the hydraulic fluid according to the first embodiment of the present invention is described.

This embodiment uses mainly two sources of heat, such as the inverter 42 and the electric motor 50. First, the channel of heat transfer by generation of heat by the inverter 42 is described. The heat of the inverter 42 is transferred to the heat sink 43 and the pump housing 56. The heat of the heat sink 43 is transferred to that portion of the pump housing 56 which surrounds the coils 52 of the electric motor 50. The heat of the pump housing 56 is transferred to the intake 61, the outlet 65 and the pump housing internal fluid passage structure 66.

Next, the channel of heat transfer by generation of heat by the coils 52 is described. The heat of the coils 52 is transferred to that portion of the hydraulic pump housing 56 which surrounds the coils 52 and the rotor 53. The heat transferred to the rotor 53 is transferred to the rotating shaft 54. The rotating shaft 54 transfers the heat to a pump rotor 64. Then, this heat transferred to the pump rotor 64 is transferred to the pump housing 56. This heat transferred to the pump housing 56 is transferred to the intake 61, the outlet 65 and the pump housing internal fluid passage structure 66.

With the above-mentioned channels of heat transfer, the hydraulic fluid is effectively warmed up by transferring the heat to the pump housing internal fluid passage structure 66 on the discharge side of the pump 60 and/or fluid passage(s) on the intake side of the pump 60.

From the preceding description, it is now appreciated that, according to this embodiment, the control unit 40, the electric motor 50 and the pump 60 are integrated within the pump housing 56, and the pump housing internal fluid passage structure 66 connected to the pump 60 is close to and in heat transfer communication with the sources of heat, such as, the electric motor 50 and the inverter 42.

The pump housing internal fluid passage structure 66 is insulated with its distance from the open air kept away because the pump housing internal fluid passage structure 66 is in the central part of the pump housing 56 that stores, as a heat storage body, heat generated by the electric motor 50 and the inverter 42. The temperature of the hydraulic fluid is kept high, and the time change of the temperature is made mild because the pump housing 56, in which the source of heat, the pump 60 and the inverter 42 are integrated, stores a great thermal energy and surrounds the pump housing internal fluid passage structure 66 to insulate same.

As a result of the mild time change of the temperature of the hydraulic fluid, the viscosity of the hydraulic fluid is subject to a gradual change, making it possible to stabilize the steering power-assist. The target value of d-axis current Id*, which is used to drive the electric motor 50, is output to raise the temperature of the coils 52 when the steering is not operated and the temperature of the hydraulic fluid is lower than the lowest temperature T0. For the above-mentioned reason, even when the steering is not operated so that the electric motor 50 does not rotate and the temperature of the hydraulic fluid is low, the temperature of the hydraulic fluid can approach a target temperature. Therefore, it is possible to further stabilize the steering power-assist.

Figure 9A:
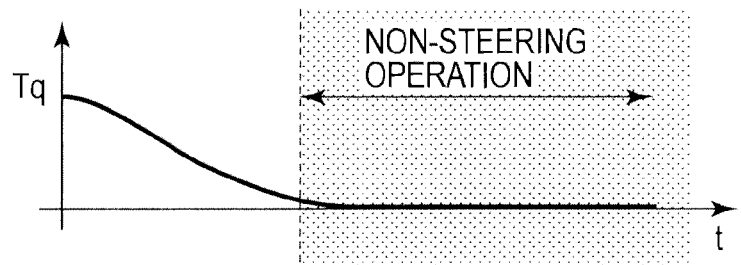
FIGS. 9A to 9E show varying of signals Tq, ω, Iq*, Id* and Th with different values of time t, according to the first embodiment, before and after finding the non-steering operation.
Figure 9B:
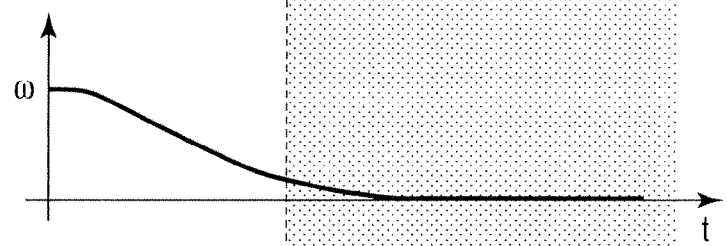
Figure 9C:
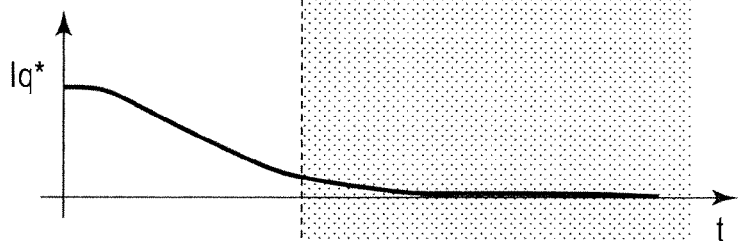
Figure 9D:
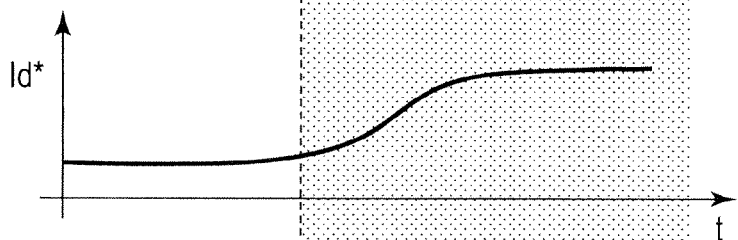
Figure 9E:
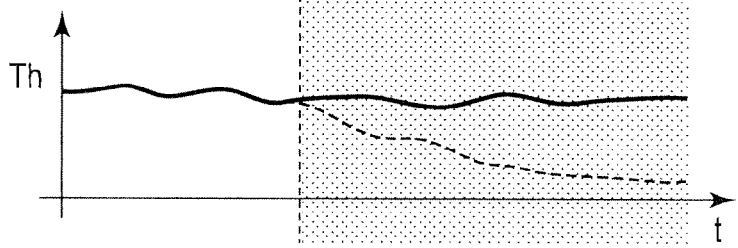

Referring to FIGS. 9A to 9E, the fully drawn line in FIG. 9E shows varying of hydraulic fluid temperature Th with respect to time t in the neighborhood of the outlet 65 of the pump 60 when the target value of q-axis current Iq* (see FIG. 9C) and the target value of d-axis current Id* vary (see FIG. 9D) with different values of the steering input torque Tq (see FIG. 9A). In FIG. 9E, the fully drawn line shows varying of hydraulic fluid temperature Th according to the embodiment in which the target value of d-axis current Id* grows upon and after entering non-steering operation (see FIG. 9D) when the vehicle driver does not operate the steering wheel 10 and the steering input torque Tq is zero, while the broken line shows varying of hydraulic fluid temperature Th according to a comparative example in which the present invention is not implemented so that the target value of d-axis current Id* stays at zero level upon and after entering the non-steering operation. Referring to FIG. 9A, the fully drawn line shows varying of steering input torque Tq with respect to time t before entering the non-steering operation and upon or after entering the non-steering operation. Referring to FIG. 9B, the fully drawn line shows varying of the revolution speed (rpm) ω of the motor 50 with different values of the steering input torque Tq shown in FIG. 9A.

According to the first embodiment, the pump housing 56 is formed as a heat storage body in such a way that the control unit 40, the electric motor 50 and the hydraulic pump 60 are close to each other and integrated, the inverter 42 of the control unit 40 and the electric motor 50 are used as sources of heat and the heat sink 43 is next to the inverter 42 and the electric motor 50.

This integrated construction can store the heat generated by the two sources of heat, such as the inverter 42 and the coils 52 of the electric motor 50, by securing a great volume for the heat storage body (the pump housing 56 and the heat sink 43). In addition, the pump housing internal fluid passage structure 66 inside the pump housing 56, which forms a route of hydraulic fluid from the outlet 65 of the pump 66 to the pump housing external piping 70, is kept away from the outside and insulated from the open air because it is surrounded by the pump housing 56.

Thus, as different from the prior art in which the motor coils only are used as a source of heat, the first embodiment uses the inverter 42 as another source of heat to increase the thermal energy and this increased thermal energy is stored by the pump housing 56, in which a great volume is secured by integrating the electric motor 50, the inverter 42 and the heat sink 43. In addition, according to this first embodiment, the pump housing 56 stores heat quickly because, in addition to a channel of heat transfer to the pump housing 56 from the coil 52 of the electric motor 50 and the inverter 42, there is a channel of heat transfer to the pump housing 56 from the pump 60 through the heat sink 43, rotating shaft 54 and pump rotor 64. Furthermore, the hydraulic fluid is insulated so that the time change of hydraulic fluid temperature is mild because the hydraulic fluid passes through that portion of the hydraulic pump housing 56 which lies in the neighborhood of the maximum distance from the outside.

As readily seen from the preceding description of the first embodiment, the torque sensor 30 is relied on for the control unit 40 to find whether or not non-steering operation is performed by the vehicle driver. Thus, the torque sensor 30 may be called a device detecting the state of steering operation of the vehicle's steering mechanism. However, the device detecting the state of steering operation is not limited to the torque sensor 30. For example, a system is known for performing a process to find a vehicle driver's intent to steer the vehicle based on an input from an obstacle recognition unit including a front-view camera and an input from the steering angle sensor 33. Such known system is disclosed, for example, in U.S. Pat. No. 7,386,371 B2 (Kuge et al.), U.S. Pat. No. 7,349,767 B2 (Kuge at al.) and U.S. Pat. No. 7,440,823 B2 (Yamamura et al). Thus, this known system is another example of the device detecting the state of steering operation by the vehicle driver.

According to the first embodiment, the electric motor 50 drives the rotating shaft 54, which, in turn, drives the pump 60. The electric motor 50, the rotating shaft 54 and the pump 60 cooperate with each other to form a power assist device applying a power-assist to the vehicle's steering mechanism.

According to the first embodiment, the heat sink 43 is one example of a heat storage element. However, the heat storage element is not limited to the heat sink. A number of materials will work as the heat storage. Any suitable heat storage may be used as the heat storage element.

According to the first embodiment, the hydraulic fluid or oil is one example of working fluid medium. The working fluid medium is not limited to this example. Any suitable fluid medium may be used as the working fluid medium.

According to the first embodiment, the power cylinder 80 with the piston 81 is one example of an actuator operable on the working fluid medium. However, the actuator is not limited to this example. Any mechanical device, which is operated by fluid pressure of working fluid medium, for moving or controlling a mechanism or system, may be used as the actuator.

(Results Produced by the First Embodiment)

(1) In addition to the structure that the inverter 42 and the electric motor 50 are integrated in such a way that they are next to each other, the fluid passage structure 66 for working fluid medium is close to and thus in heat transfer communication with the inverter 42. For this reason, the temperature dependent variations of the working fluid medium are controllable by transferring heat generated by the inverter 42 and the electric motor 50 to the working fluid medium passing through the fluid passage structure 66. Therefore, it is possible to stabilize operation of the actuator operated by fluid pressure of working fluid medium created by the pump 60 driven by the electric motor 50.

(2) The inverter 42 and the tank 62 that contains the working fluid medium are on the same side of the rotating shaft 54. For this reason, all of the parts can be put together in less space.

(3) In addition to the structure that the inverter 42 and the electric motor 50 are integrated in such a way that they are next to each other, the fluid passage structure 66 is closer to the inverter 42 and the electric motor 50 than the pump 60 is. For this reason, the temperature dependent variations of the working fluid medium are controllable by transferring heat generated by the inverter 42 and the electric motor 50 to the working fluid medium passing through the fluid passage structure 66. Therefore, it is possible to stabilize operation of the actuator operated by fluid pressure of working fluid medium created by the pump 60 driven by the electric motor 50.

(4) In addition to the structure that the inverter 42 and the electric motor 50 are integrated in such a way that they are next to each other, the fluid passage structure 66 on the discharge side of the pump 60 and/or fluid passage(s) on the intake side of the pump 60 are closer to the inverter 42 and the electric motor 50 than the pump 60 is. For this reason, the temperature dependent variations of the working fluid medium are controllable by transferring heat generated by the inverter 42 and the electric motor 50 to the working fluid medium passing through the fluid passage structure 66 on the discharge side of the pump 60 and/or through the passage(s) on the intake side of the pump 60. Therefore, it is possible to stabilize operation of the actuator operated by fluid pressure of working fluid medium created by the pump 60 driven by the electric motor 50.

(5) The housing 56 has therein the electric motor 50, the inverter 42, and the heat storage element 43 that stores heat generated by the electric motor 50 and the inverter 42. In addition to the arrangement that the storage body element 43 is next to the inverter 42 and the electric motor 50, the fluid passage structure 66 on the discharge side of the pump 60 and/or the fluid passage(s) on the intake side of the pump 60 are in the central part of the housing 56. For this reason, it becomes easy to raise the temperature of the working fluid medium by transferring heat generated at the electric motor 50 and the inverter 42 to the working fluid medium.

(6) The fluid passage structure 66 extends through an area around the rotating shaft 54 within the housing 56. For this reason, within the housing 56, efficiently arranging the fluid passage structure 66, the heat from the electric motor 50 transmitted by the rotating shaft 54 is efficiently supplied to the working fluid medium through the fluid passage structure 66.

(7) In addition to the structure that the inverter 42 and the electric motor 50 are integrated in such a way that they are next to each other, the fluid passage structure 66 is close to the inverter 42 via the housing 56 in such a way that the heat generated by the inverter 42 and the electric motor 50 is transferred to the housing 56 and the housing 56 transfers the heat to the fluid passage structure 66. Therefore, in addition to raising the temperature of the working fluid medium by transferring the heat generated by the inverter 42 and the electric motor 50 to the working fluid medium, it is possible to efficiently cool down the inverter 42 and the electric motor 50.

(8) In addition to the arrangement that the inverter 42 and the tank 62 that contains the working fluid medium are on the same side of the rotating shaft 54 of the electric motor 50, the fluid passage structure 66 is between the inverter 42 and the tank 62 to transfer the heat generated by the inverter 42 to the fluid passage structure 66, which, in turn, transfers the heat to the tank 62. Therefore, it is possible to efficiently cool down the inverter 42 by promptly transmitting the heat of the inverter 42 to the fluid passage structure 66.

(9) In addition to the structure that the inverter 42 and the electric motor 50 are integrated in such a way that they are next to each other, the fluid passage structure 66 is closer to the inverter 42 and the electric motor 50 than the pump 60 is to transfer the heat generated by the inverter 42 and the electric motor 50 to the fluid passage structure 66, which, in turn, transfers the heat to the pump 50. Therefore, it is possible to cool down the inverter 42 and the electric motor 50 by transferring the heat generated by the inverter 42 and the electric motor 50 to the fluid passage structure 66.

(10) In addition to the structure that the inverter 42 and the electric motor 50 are integrated in such a way that they are next to each other, the fluid passage structure 66 on the discharge side of the pump 60 and/or fluid passage(s) on the intake side of the pump 60 are closer to the inverter 42 and the electric motor 50 than the pump 60 is to transfer the heat generated by the inverter 42 and the electric motor 50 to the fluid passage structure 66 on the discharge side of the pump 60 and/or the fluid passage(s) on the intake side of the pump 60, which, in turn, transfer the heat to the pump 60. Therefore, it is possible to promptly cool down of the inverter 42 and the electric motor 50 by transmitting the heat generated by the inverter 42 and the electric motor 50 to the fluid passage structure 66 on the discharge side of the pump 60 and/or the fluid passage(s) on the intake side of the pump 60 and then transmitting the heat to the pump 60 from the fluid passage structure 66 and/or the fluid passage(s).

(11) The housing 56 has therein the electric motor 50, the inverter 42, and the heat storage element 43 that stores heat generated by the electric motor 50 and the inverter 42. In addition to the arrangement that the heat storage element 43 is next to the inverter 42 and the electric motor 50, the fluid passage structure 66 on the discharge side of the pump 60 and/or the fluid passage(s) on the intake side of the pump 60 are in the central part of the housing 56 to transfer the heat stored by the heat storage element 43 to the fluid passage structure 66 and/or the fluid passage(s). Therefore, it is possible to promptly cool down the electric motor 50 and the inverter 42 by transferring the heat to the fluid passage structure 66 and/or the fluid passage(s).

(12) The fluid passage structure 66 extends through an area around the rotating shaft 54 within the housing 56 to transfer the heat stored by the heat storage element 43 to the fluid passage structure 66. Therefore, it is possible to cool down the electric motor 50 by transferring the heat of the electric motor 50 through the rotating shaft 54 and the fluid passage structure 66.

(13) The control unit 40 raises the temperature of the working fluid medium by passing electric current through the coils 52 of the electric motor 50 to cause the coils 52 to generate heat. Therefore, it is possible to adjust the temperature of the working fluid medium to a target temperature by the heat generated by the coils 52 of the electric motor 50 when the temperature of the working fluid medium is low.

(14) When the temperature of the working fluid medium is less than a predetermined temperature threshold upon finding the non-steering operation, the control unit 40 calculates electric current to cause the coils 52 of the electric motor 50 to generate heat for temperature rise. Therefore, it is possible to cause the temperature of the working fluid medium to approach a target temperature by causing the coils 52 of the electric motor 50 to generate heat when the temperature of the working fluid medium is low during the non-steering operation where the electric motor is not in operation.

(15) There are plural sets of assisting force command maps, which include a first set of assisting force command maps for use in adjusting the temperature of the working fluid medium and a second set of force command maps for use not in adjusting the temperature of the working fluid medium. Any one set of the plural sets of assisting force command maps is selected to calculate currents for the coils 52 to generate heat. Therefore, it is easy to calculate appropriate current values depending on state of temperature of the working fluid medium because the assisting force command currents are calculated by switching the assisting force command maps.

(16) Heat generated by the electric motor 50 and the inverter 42 is transferred to the fluid passage structure 66 for the working fluid medium by integrating the electric motor 50 and the inverter 42, which controls the electric motor 50, in such a way that they are next to each other, and by arranging the fluid passage structure 66 close to and thus in heat transfer communication with the inverter 42. For this reason, the temperature variations of the working fluid medium are controlled by transmitting the heat generated by the inverter 42 and the electric motor 50 to the fluid passage structure 66. Therefore, it is possible to stabilize operation of the actuator. Moreover, it is possible to promptly cooling down the inverter 42 and the electric motor 50.

Second Embodiment

Next, the second embodiment is described. The second embodiment is substantially the same as the first embodiment except that, according to the first embodiment, the assisting force command generation unit 41b finds an appropriate temperature value using a predetermined map and sets it as a standard temperature Tg, around which a temperature control range is set, but, according to the second embodiment, the assisting force command generation unit 41b sets a temperature Th, which is detected by the temperature sensor 32 after lapse of a predetermined time threshold Tth from the system startup (beginning of vehicle run), as the standard temperature Tg. In the same manner as the first embodiment, the assisting force command generation unit 41b calculates a target temperature for temperature control in such a way that the hydraulic fluid temperature Th is kept within the temperature control range and generates a q-axis current command Iq*, i.e., a target value of a q-axis (torque) current Iq for the electric motor 50, and a d-axis current command Id*, i.e., a target value of a d-axis (magnetizing) current Id, which are required for generation of power-assist needed for the steering power-assist control.

Figure 10:
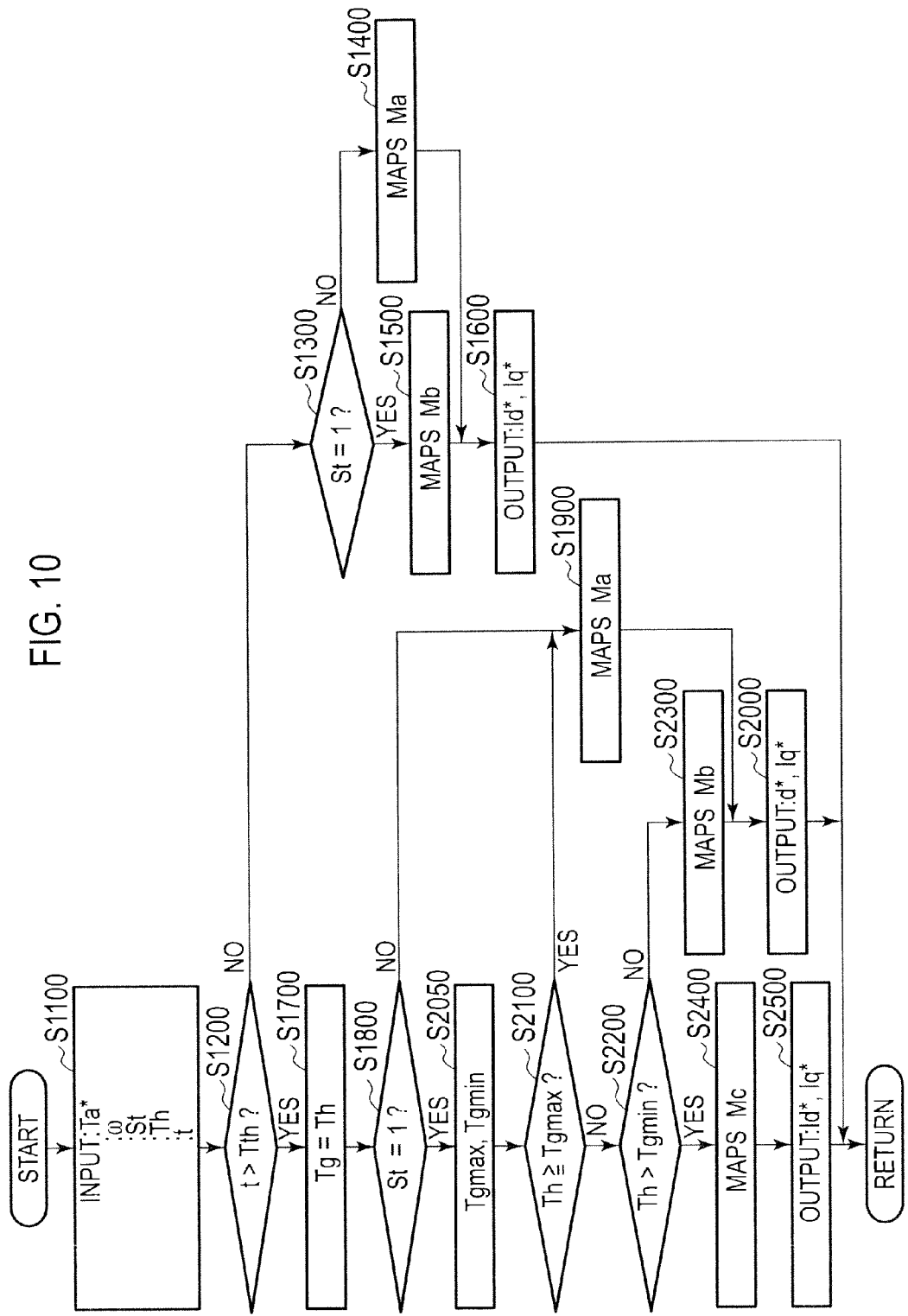
FIG. 10 is a flowchart showing how the control unit controls the electric motor according to the second embodiment.

Accordingly, the second embodiment is different from the first embodiment in the motor control. Referring to FIG. 10, the motor control according to the second embodiment is described.

Turning on the ignition switch of an automobile 1A initiates repetition of execution of the flowchart shown in FIG. 10. The execution of the flowchart begins when a control unit 40 inputs, by reading operation, a basic power-assist command Ta*, revolution speed (rpm) ω, non-steering operation flag St and hydraulic fluid temperature Th (step S1100). As different from the first embodiment, the control unit 40 inputs, by reading operation, an elapsed time t that has passed from the system startup (beginning of vehicle run). The elapsed time t may be obtained by reading a system clock of the control unit 40.

Next, the control unit 40 finds whether or not the elapsed time t from system startup is greater than a predetermined time threshold Tth (step S1200). The appropriate time for the predetermined time threshold Tth is selected from consideration of the period of time required for sufficiently warming up the main driving parts (engine, accessory etc) in the vehicle 1A. For example, the time until the display of the engine cooling meter disappears may be selected for the predetermined time threshold Tth. When, at step S1200, it finds that the elapsed time t from system startup is not greater than the predetermined time threshold Tth, the control unit 40 finds whether or not the non-steering operation flag St is "1" (step S1300).

When, at step S1300, it finds that the non-steering operation flag St is not "1", the control unit 40 uses maps Ma for usual power-assist control to find a target value of q-axis current Iq* and a target value of d-axis current Id* against the revolution speed (rpm) ω (step S1400) because the hydraulic fluid temperature rises when the electric motor 50 operates and it is not necessary to execute a control for raising the hydraulic fluid temperature.

When, at step S1300, it finds that the non-steering operation flag St is "1", the control unit 40 uses maps Mb for hydraulic fluid temperature raising control to find the target value of q-axis current Iq* and the target value of d-axis current Id* against the revolution speed (rpm) ω (step S1500) because, when the electric motor 50 does not operate, it is necessary to execute the control for raising the hydraulic fluid temperature. After step S1400 or S1500, the control unit 40 outputs the target value of q-axis current Iq* and the target value of d-axis current Id* which have been found using the map Ma or Mb (step S1600).

On the other hand, when, at step S1200, it finds that the elapsed time t from system startup is greater than the time threshold Tth, the control unit 40 sets the current hydraulic fluid temperature Th as the standard temperature Tg (step S1700). Then, in order to control temperature variations of hydraulic fluid within a temperature control range so that great fluctuations of hydraulic fluid temperature do not influence the steering power-assist, the control unit 40 sets a temperature control range around the standard temperature Tg by setting a value as an upper limit Tgmax of the temperature control range and by setting another value as a lower limit Tgmin of the temperature control range.

Figure 11:
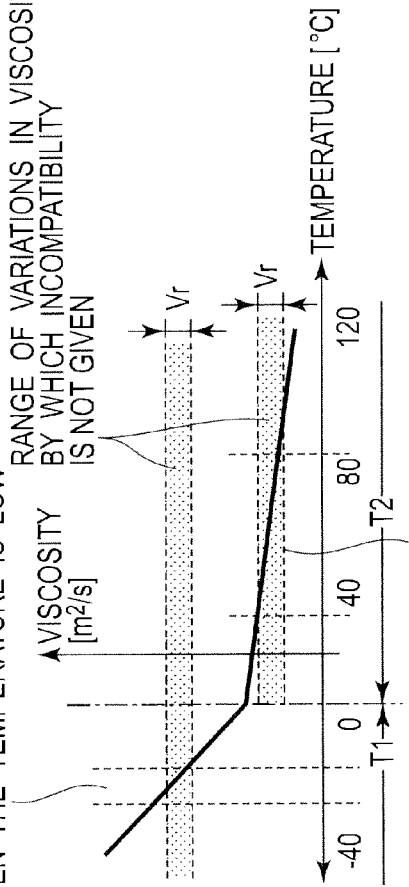
FIG. 11 is a diagram of a viscosity versus temperature characteristic curve of working fluid medium.

Referring to FIG. 11, the viscosity versus temperature characteristic curve for the hydraulic fluid has a steep inclination over a low temperature area T1 and a less steep inclination over a high temperature area T2. Using this characteristic curve, in order to keep the variations in hydraulic fluid viscosity within a predetermined constant range Vr, the control unit 40 sets a value as the upper limit Tgmax of the temperature control range and sets another value as the lower limit Tgmin of the temperature control range based on finding which one of the low and high temperature areas T1 and T2 the standard temperature Tg falls in. Therefore, a difference between the upper limit Tgmax and the lower limit Tgmin is small when the standard temperature Tg falls in the low temperature area T1, while the difference is big when the standard temperature Tg falls in the high temperature area T2. As a result, when the standard temperature Tg falls in the high temperature range T2, controlling the hydraulic fluid temperature is not carried out too frequently, thereby suppressing unnecessary consumption of electric energy.

Referring back to FIG. 10, the control unit 40 finds whether or not the non-steering operation flag St is "1" (step S1800). When, at step S1800, it finds that the non-steering operation flag St is not set (St=0), the control unit 40 uses the maps Ma for usual power-assist control to find a target value of q-axis current Iq* and a target value of d-axis current Id* against the revolution speed (rpm) ω (step S1900). And, the control unit 40 outputs the target value of q-axis current Iq* and the target value of d-axis current Id* which have been found using the maps Ma (step S2000).

On the other hand, when, at step S1800, it finds that the non-steering operation flag St is set (St=1), the control unit 40 sets a value as the upper limit Tgmax and sets another value as the lower limit Tgmin based on finding which one of the low and high temperature areas T1 and T2 the standard temperature Tg falls in (step S2050). After step S2050, the control unit 40 finds whether or not the hydraulic fluid temperature Th is greater than or equal to the upper limit Tgmax (step S2100). When, at step S2100, it finds that the hydraulic fluid temperature Th is greater than or equal to the upper limit Tgmax, the control unit 40 makes a shift to processing at step S1900.

On the other hand, when, at step S2100, it finds that the hydraulic fluid temperature Th is less than the upper limit Tgmax, the control unit 40 finds whether or not the hydraulic fluid temperature Th is greater than the lower limit Tgmin (step S2200). When, at step S2200, it finds that the hydraulic fluid temperature is not greater than the lower limit Tgmin, the control unit 40 uses the maps Mb for hydraulic fluid temperature raising control to find the target value of q-axis current Iq* and the target value of d-axis current Id* against the revolution speed (rpm) ω (step S2300). After step S2300, the control unit 40 makes a shift to processing at step S2000.

On the other hand, when, at step S2200, it finds that the hydraulic fluid temperature Th is greater than the lower limit Tgmin, the control unit 40 uses maps Mc, in which target values of d-axis current Id* are suppressed as compared to the target values of d-axis current Id* included by the maps Mb, to find the target value of q-axis current Iq* and the target value of d-axis current Id* against the revolution speed (rpm) ω (step S2400). The quality of the maps Mc is described later. After step S2400, the control unit 40 outputs the target value of q-axis current Iq* and the target value of d-axis current Id* which have been found using the maps Mc (step S2500). After the step S1600 or S2000 or S2500, the control unit 40 repeats the execution of this flowchart for motor control.

(Quality of Maps Mc)

Figure 12:
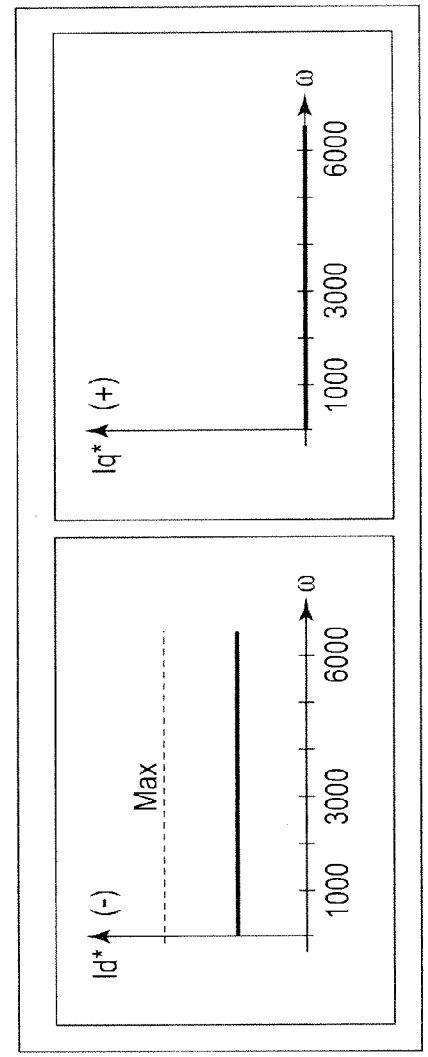
FIG. 12 shows maps Mc, which are selected for use in rendering the electric motor operable to generate heat for, suppressing power consumption, keeping the temperature of the working fluid medium within a temperature control range.

Referring to FIG. 12, the quality of maps Mc, which are used for the motor control, is described. The maps Mc are substantially the same as the maps Mb. In the same manner as the maps Mb, the maps Mc include an Iq*(ω) map which sets a zero as the target value of q-axis current Iq* with different values of revolution speed (rpm) ω of the motor 50 when the steering operation flag St is set (St=1) and the basic power-assist command Ta* is zero (Ta*=0). However, the maps Mc include an Id*(ω) map which sets a suppressed value of d-axis current as the target value of d-axis current Id* with different values of revolution speed (rpm) ω of the motor 50 when the steering operation flag St is set (St=1) and the basic power-assist command Ta* is zero (Ta*=0). According to the maps Mc, the suppressed value of d-axis current is set as the target value of d-axis current Id*, while according to the maps Mb, the maximum value of d-axis current is set as the target value of d-axis current Id*. For example, the maps Mc sets one half of the maximum value of d-axis current as the suppressed value.

(Function)

FIGS. 13A to 13E show variations of hydraulic fluid temperature Th with respect to time t when the temperature control is executed according to the second embodiment by setting a current value of hydraulic fluid temperature detected upon lapse of the predetermined time threshold Tth as the standard temperature Tg and controllably keeping the hydraulic fluid temperature Th within the temperature control range that is set around the standard temperature Tg.

Figure 13A:
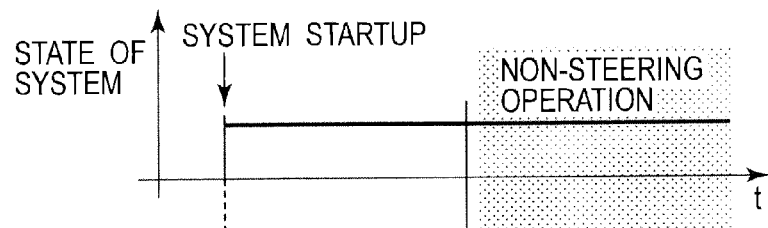
FIGS. 13A-13E show varying of signals Iq*, Id* and Th with different values of time t, according to the second embodiment, before and after finding the non-steering operation after lapse of a predetermined time threshold Tth from system startup.
Figure 13B:
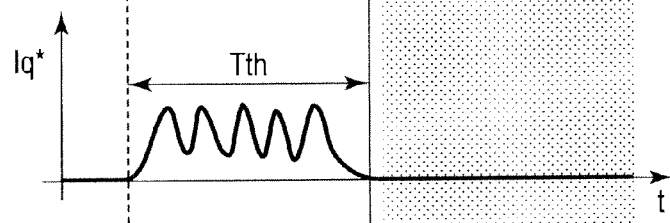
Figure 13C:
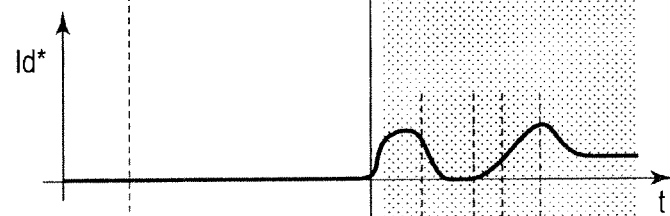
Figure 13D:
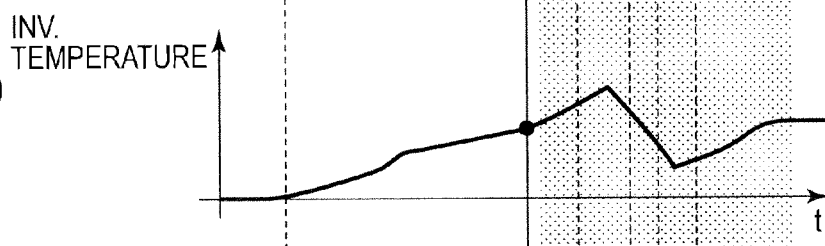
Figure 13E:
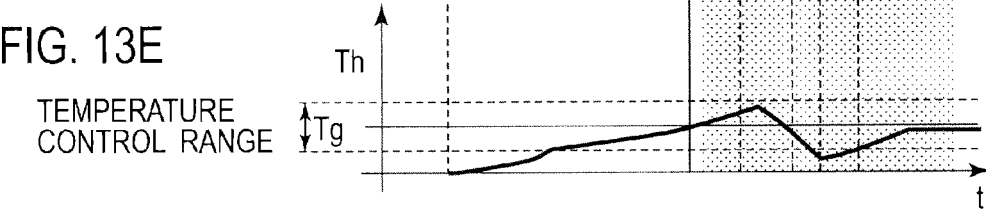

In FIG. 13E, the fully drawn line shows varying of hydraulic fluid temperature Th with respect to time t when the vehicle driver operates the steering during a time period between the moment of system startup and the moment of lapse of the predetermined time threshold Tth. It also shows varying of hydraulic fluid temperature Th during the subsequent time period, which takes place after the lapse of the predetermined time threshold Tth, when the vehicle driver does not operate the steering and thus the non-steering operation flag St is set (St=1). The control unit 40 uses the maps Ma (see FIG. 7A) to find the target values of q-axis current and d-axis current Iq* and Id* during the time period between the moment of system startup and the moment of the lapse of the predetermined time threshold Tth so that the target value of q-axis current Iq* varies with different values of the steering input torque (see FIG. 13B), but the target value of d-axis current Id* is almost zero because it is assumed that the electric motor 50 operates at revolution speeds ω less than 2,000 rpm (see FIG. 13C). Upon and after the moment of the lapse of the predetermined time threshold Tth, a current detected value of the hydraulic fluid temperature Th is set as the standard temperature Tg around which the temperature control range is set (see FIG. 13E) by using FIG. 11 to find a value for the upper limit Tgmax and another value for the lower limit Tgmin. When, subsequently the vehicle driver stops operating the steering so that the non-steering operation flag St is set (St=1), the control unit 40 uses the maps Mc (see FIG. 12) to find the target values of q-axis current and d-axis current Iq* and Id* so that zero is set for the target value of q-axis current Iq* and one half of the maximum value is set for the target value of d-axis current Id* as long as the hydraulic fluid temperature Th falls in the temperature control range that is set around the standard temperature Tg. As the hydraulic temperature Th rises and exceeds the upper limit Tgmax of the temperature control range, the control unit 40 uses the maps Ma (see FIG. 7A) so that zero is set not only as the target value of q-axis current Iq* but also as the target value of d-axis current Id*. As a result, the variations of the hydraulic fluid temperature Th are kept within the temperature control range.

Referring also to FIG. 4, the assisting force command generation unit 41b of the control unit 40 controls the d-axis current after setting a current value of hydraulic fluid temperature detected upon the lapse of the predetermined time threshold Tth as the standard temperature Tg and setting the temperature control range around the standard temperature Tg. As a result, the hydraulic fluid temperature Th is kept within the temperature control range. According to the second embodiment, because a current value of hydraulic fluid temperature Th that appears depending on the current environments around the automobile 1A is set as the standard temperature Tg, the hydraulic fluid temperature Th, that is, the viscosity of hydraulic fluid, can be controlled in such a way that it is kept within the temperature control range that is adjusted to the environments around the automobile 1A.

As explained above, according to the second embodiment, the temperature of the working fluid medium is controlled based on the equilibrium point of the temperature of the working fluid medium in the pump 60 accomplished by radiation of heat to the open air and generation of heat by the vehicle running gear. Therefore, it is possible to stabilize the steering power-assist, thus preventing the sense of incompatibility derived from the variations of reaction to the steering input.

According to the second embodiment, the vehicle speed sensor 31 is an example of a vehicle running state detector detecting state of running of the automobile 1A, and the temperature sensor 32 is an example of a temperature detector detecting temperature of working fluid medium. However, the vehicle running state detector is not limited to this example and may include any device configured to detect or estimate the state of running of the automobile 1A. On the other hand, the temperature detector is not limited to this example and may include any device configured to detect or estimate the temperature of the working fluid medium. For example, a device or system to estimate the temperature of the working fluid medium based on the temperature of the inverter 42 because the temperature of the working fluid medium follow varying of the temperature of the inverter 42 as is readily seen from comparison of FIG. 13E to FIG. 13D. The temperature detector includes such device or system.

(Results Produced by the Second Embodiment)

(1) According to the second embodiment, a temperature control range is set based on a value of the temperature of working fluid medium detected after lapse of the predetermined time threshold Tth from the startup of vehicle running, and the electric currents are calculated in such a way that the coils 52 generate heat to raise the temperature of the working fluid medium to the temperature control range. Therefore, because it is possible to control the temperature of the working fluid medium based on the equilibrium point of the temperature of the working fluid medium, it is possible to stabilize the steering power-assist, thus preventing the sense of incompatibility derived from the variations of reaction to steering input.

Third Embodiment

Next, the third embodiment is described. The third embodiment is substantially the same as the second embodiment except that, according to the second embodiment, the non-steering operation finding unit 41d finds whether or not the vehicle driver operates the steering and sets the non-steering operation flag St (St=1) when it finds that the vehicle driver operates the steering, but, the third embodiment does not require such non-steering operation finding unit 41d. However, in the same manner as the second embodiment, according to the third embodiment, the assisting force command generation unit 41b sets a temperature Th, which is detected by the temperature sensor 32 after the lapse of a predetermined time threshold Tth from the system startup (startup of vehicle running), as the standard temperature Tg around which a temperature control range is set.

Figure 14:
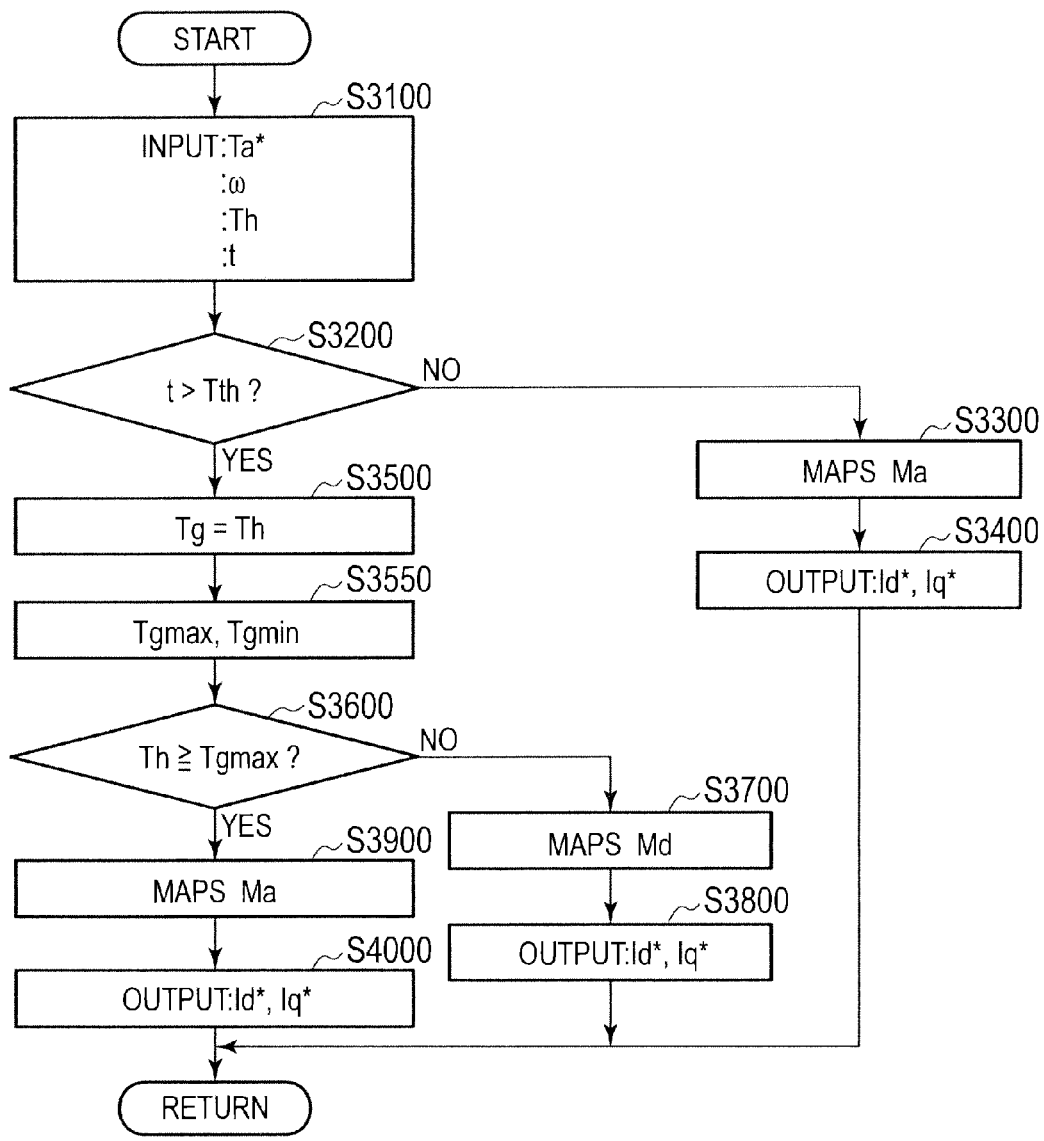
FIG. 14 a flowchart showing how the control unit controls the electric motor according to the third embodiment.

Accordingly, the third embodiment is different from the second embodiment in the motor control. Referring to FIG. 14, the motor control according to the second embodiment is described.

Turning on the ignition switch of an automobile 1A initiates repetition of execution of the flowchart shown in FIG. 14. The execution of the flowchart begins when a control unit 40 inputs, by reading operation, a basic power-assist command Ta*, revolution speed (rpm) ω, hydraulic fluid temperature Th, and an elapsed time t from system startup (startup of vehicle running) (step S3100). The elapsed time t may be obtained by reading a system clock of the control unit 40.

Next, the control unit 40 finds whether or not the elapsed time t from the system startup is greater than the predetermined time threshold Tth (step S3200). In the same manner as the second embodiment, the appropriate time for the predetermined time threshold Tth is selected from consideration of the period of time required for sufficiently warming up the main driving parts (engine, accessory etc) in the vehicle 1A. For example, the time until the display of the engine cooling meter disappears may be selected for the predetermined time threshold Tth.

When, at step S3200, it finds that the elapsed time t from system startup is not greater than the predetermined time threshold Tth, the control unit 40 uses the maps Ma for usual power-assist control to find a target value of q-axis current Iq* and a target value of d-axis current Id* against the revolution speed (rpm) ω (step S3300). And, the control unit 40 outputs the target value of q-axis current Iq* and the target value of d-axis current Id* which have been found using the maps Ma (step S3400).

On the other hand, when, at step S3200, it finds that the elapsed time t from the system startup is greater than the predetermined time threshold Tth, the control unit 40 sets the current hydraulic fluid temperature Th as the standard temperature Tg (step S3500). After step S3500, in the same manner as the second embodiment at step S2050, the control unit 40 uses FIG. 11 to set a value as the upper limit Tgmax and to set another value as the lower limit Tgmin based on the finding which one of the low and high temperature areas T1 and T2 the standard temperature Tg falls in (step S3550). After step S3550, the control unit 40 finds whether or not the hydraulic fluid temperature Th is greater than or equal to the upper limit Tgmax (step S3600).

When, at step S3600, it finds that the hydraulic fluid temperature Th is less than the upper limit Tgmax, the control unit 40 uses maps Md for power-assist control to find a target value of q-axis current Iq* and a target value of d-axis current Id* (step S3700). And, the control unit 40 outputs the target value of q-axis current Iq* and the target value of d-axis current Id* which have been found using the maps Md (step S3800). At step 3800, since the hydraulic fluid temperature Th is less or lower than the upper limit Tgmax, the control unit 40 not only raises the hydraulic fluid temperature Th by allowing the d-axis current Id to pass through the electric motor 50, but also to generate power-assist by allowing the q-axis current to pass through the electric motor 50.

On the other hand, when, at step S3600, it finds that the hydraulic fluid temperature Th is greater than or equal to the upper limit Tgmax, the control unit 40 uses the maps Ma for usual power-assist control to find a target value of q-axis current Iq* and a target value of d-axis current Id* (step S3900). And, the control unit 40 outputs the target value of q-axis current Iq* and the target value of d-axis current Id* which have been found using the maps Ma (step S4000). After the step S3400 or S3800 or S4000, the control unit 40 repeats the execution of this flowchart for motor control.

(Quality of Maps Mc)

Figure 15:
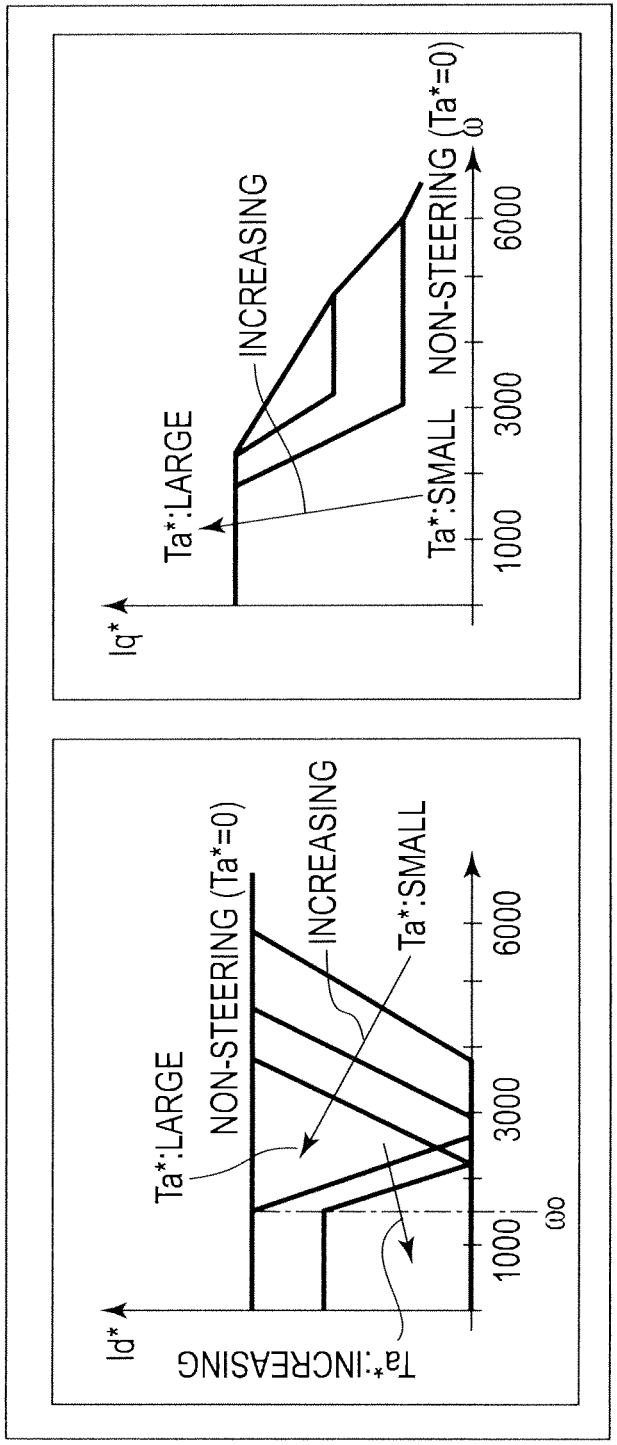
FIG. 15 shows maps Md, which are selected for use in rendering the electric motor operable to generate heat and/or torque for quickly keeping the temperature of the working fluid medium within a temperature control range.

Referring to FIG. 15, the quality of maps Md, which are used for the motor control when the hydraulic fluid temperature Th is less than the upper limit Tgmax, is described.

As mentioned before, the maps Md are tailored to control q-axis and d-axis currents passing through the electric motor 50 in response to the basic power-assist command Ta* and revolution speed (rpm) Lu of the electric motor 50. The maps Md include an Iq*(ω, Ta*) map having a set of lines, each showing varying of the target value of q-axis current Iq* with different values of revolution speed (rpm) ω of the motor 50, which are prepared for different values of power-assist command Ta*. The maps Md also include an Id*(ω, Ta*) map having a set of lines, each showing varying of the target value of d-axis current Id* with different values of revolution speed (rpm) ω of the motor 50, which are prepared for different values of power-assist command Ta*.

The Id*(ω, Ta*) map of the maps Md shown in FIG. 15 includes a line which, when the hydraulic fluid temperature Th is less than the upper limit Tgmax (see step S3600), sets the maximum value of d-axis current as the target value of d-axis current Id* when the basic power-assist command Ta* is zero (Ta*=0) in the same manner as the Id*(ω) map of the maps Mb shown in FIG. 7B. When the hydraulic fluid temperature Th is less than the upper limit Tgmax, the Iq*(ω, Ta*) map of the maps Md sets a zero as the target value of q-axis current Iq* with different values of revolution speed (rpm) ω of the motor 50 when the basic power-assist command Ta* is zero (Ta*=0) in the same manner as the Iq*(ω) map of the maps Mb shown in FIG. 7B.

When the basic power-assist command Ta*, i.e., a target value of basic power-assist Ta, is less than a predetermined power-assist threshold, and the revolution speed (rpm) ω of the electric motor 50 is less than a predetermined revolution speed threshold $ω_0$ under a condition when the hydraulic fluid temperature Th is less than the upper limit Tgmax, the Id*(ω, Ta*) map of the maps Md sets the maximum value of d-axis current as the target value of d-axis current Id* when the basic power-assist command Ta* is near zero. Subsequently, as the basic power-assist command Ta* appears when the revolution speed (rpm) w of the electric motor 50 stays less than the predetermined revolution speed threshold $ω_0$, the Id*(ω, Ta*) map of the maps Md sets a suppressed value of d-axis current as the target value of d-axis current Id*, while the Iq*(ω, Ta*) map of the maps Md sets the maximum value of q-axis current as the target value of q-axis current Iq*. Assuming that the basic power-assist command Ta* stays invariable, the revolution speed (rpm) increases because the maximum value of q-axis current is set as the target value of q-axis current Iq*. As the revolution speed (rpm) increases beyond the predetermined revolution speed threshold $ω_0$, the Id*(ω, Ta*) map of the maps Md decreases the target value of d-axis current Id* toward zero, and the Iq*(ω, Ta*) map of the maps Md deceases the target value of q-axis current Iq*.

Next, when, with the basic power-assist command Ta* exceeding the predetermined power-assist threshold, the revolution speed (rpm) w of the electric motor 50 increases further under the condition when the hydraulic fluid temperature Th is less than the upper limit Tgmax, the Id*(ω, Ta*) map of the maps Md provides values of d-axis current smoothly merging those values of d-axis current which are given by the id*(ω, Ta*) of the maps Ma shown in FIG. 7A because the q-axis current passes through the electric motor 50 and it is no longer necessary to rely on the d-axis current for raising the hydraulic fluid temperature.

(Function)

FIGS. 16A to 16E show variations of hydraulic fluid temperature Th with respect to time t when the temperature control is executed according to the third embodiment by setting a current value of hydraulic fluid temperature detected after elapse of the predetermined time threshold Tth from the system startup as the standard temperature Tg and controllably keeping the hydraulic fluid temperature Th within the temperature control range that is set around the standard temperature Tg.

Figure 16A:
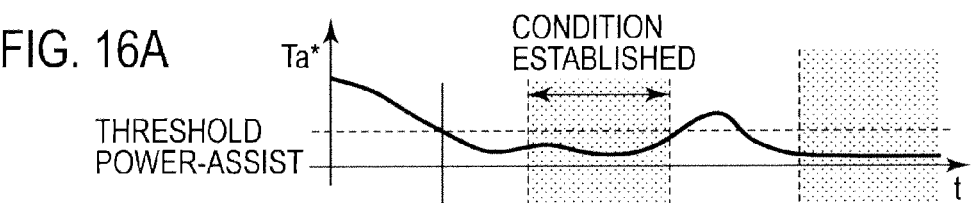
FIGS. 16A to 16E show varying of signals Iq*, Id* and Th with different values of time t, according to the third embodiment, before and after a predetermined condition is established after lapse of the predetermined time threshold Tth.
Figure 16B:
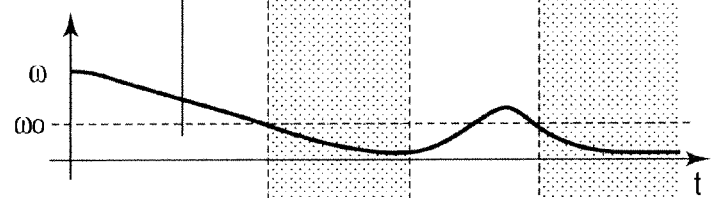
Figure 16C:
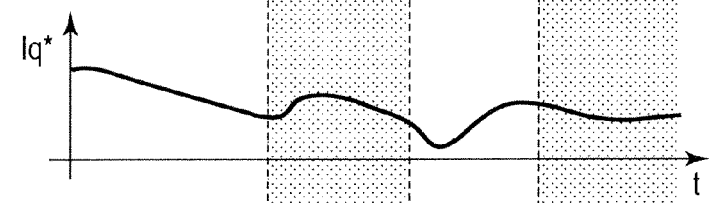
Figure 16D:
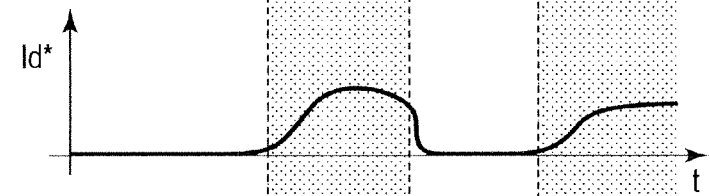
Figure 16E:
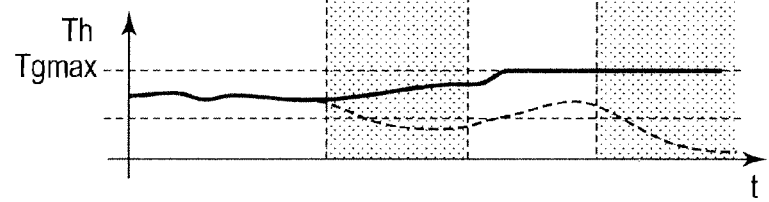

In FIG. 16E, the fully drawn line shows varying of hydraulic fluid temperature Th with respect to time t according to the third embodiment when the target value of q-axis current Iq* (see FIG. 16C) and the target value of d-axis current Id* vary (see FIG. 16D) with different values of the basic power-assist command Ta* (see FIG. 16A). In FIG. 16E, the broken line shows varying of hydraulic fluid temperature Th according to a comparative example in which the present invention is not implemented.

According to the third embodiment, the control unit 40 keeps on using the maps Md to find the target values of q-axis current and d-axis current Iq* and Id* without distinguishing either the state where the vehicle driver operates the steering or the state where the vehicle driver does not operate the steering as long as the hydraulic fluid temperature Th is less than the upper limit Tgmax. As a result, a drop in the hydraulic fluid temperature Th is prevented even during forward straight running of the automobile 1A in which the basic power-assist command Ta* is low and the revolution speed (rpm) ω of the electric motor 50 is low. The control unit 40 allows the d-axis current to pass through the electric motor 50 upon a predetermined condition being established when the hydraulic fluid temperature Th is less than the upper limit Tgmax, the revolution speed (rpm) a is less than the predetermined revolution speed threshold $ω_0$ and the target value of basic power-assist command Ta* is less than the predetermined power-assist threshold. Because it is possible to pass d-axis current through the electric motor 50 frequently according to the situation, a time required for the hydraulic fluid temperature Th to reach the upper limit Tgmax can be shortened.

As explained above, the d-axis current is allowed to pass through the coils 52 of the electric motor 50 in order to raise the temperature of the working fluid medium when non-steering operation is found or when the steering input is low (during low steering input torque and/or low motor revolution speeds). For this reason, it is possible to restrain the temperature variations of the working fluid medium within a constant temperature control range under the situation in which comparatively small steering input only appears during, such as, forward straight vehicle running. Therefore, it is possible to prevent the vehicle driver from sensing incompatibility derived from variations of steering reaction.

According to the third embodiment, the vehicle speed sensor 31 is an example of a vehicle running state detector detecting state of running of the automobile 1A, and the temperature sensor 32 is an example of a temperature detector detecting temperature of working fluid medium. However, the vehicle running state detector is not limited to this example and may include any device configured to detect or estimate the state of running of the automobile 1A. On the other hand, the temperature detector is not limited to this example and may include any device configured to detect or estimate the temperature of the working fluid medium. For example, a device or system to estimate the temperature of the working fluid medium based on the temperature of the inverter 42 because the temperature of the working fluid medium follow varying of the temperature of the inverter 42 as is readily seen from comparison of FIG. 13E to FIG. 13D. The temperature detector includes such device or system.

(Results Produced by the Third Embodiment)

(1) According to the third embodiment, a temperature control range is set based on a value of the temperature of working fluid medium detected after lapse of the predetermined time threshold Tth from the startup of vehicle running, and the electric currents are calculated when the temperature of the working fluid medium Th is less than the upper limit Tgmax under the situation in which non-steering operation is found or the steering input is low (during low steering input torque and/or low motor revolution speeds) in such a way that the coils 52 generate heat to raise the temperature of the working fluid medium to the temperature control range. For this reason, it is possible to restrain the temperature variations of the working fluid medium within a constant temperature control range under the situation in which comparatively small steering input only appears during, such as, forward straight vehicle running. Therefore, it is possible to stabilize the steering power-assist, thus preventing the sense of incompatibility derived from the variations of reaction to steering input.

Example 1 of Modification

According to each of the described embodiments, the pump housing internal fluid passage structure 66 formed through the pump housing 56 and the pump housing external piping 70, which are on the discharge side of the pump 60, are close to and thus in heat transfer communication with the electric motor 50 and the inverter 42. The embodiment may be modified such that fluid passage(s) on the intake side of the hydraulic pump 60 are close to and thus in heat transfer communication with the electric motor 50 and the inverter 42.

In this case, too, the fluid passage(s), which are on the intake side of the pump 60, is insulated with its distance from the open air kept away because the fluid passage(s) are in the central part of the pump housing 56 that stores, as a heat storage body, the heat generated by the electric motor 50 and the inverter 42. The temperature of the working fluid medium is kept high, and the time change of the temperature is made mild because the pump housing 56, in which the source of heat, the hydraulic pump 60 and the inverter 42 are integrated, stores a great thermal energy and surrounds the fluid passage (s) to insulate them.

As a result of the mild time change of the temperature of the working fluid medium, the viscosity of the working fluid medium is subject to a gradual change, making it possible to stabilize the steering power assist.

Example 2 of Modification

Each of the described embodiments has been described in such a way that the temperature sensor 32 shown in FIG. 1 detects the temperature of the working fluid medium. The embodiment may be modified such that the temperature of the inverter 42 is detected and the temperature of the working fluid medium is given by estimation based on the detected temperature of the inverter 42. In this case, it is possible to use the detected temperature of the inverter 42 to prevent overheating of the inverter 42.

Examples of Application

Each of the described embodiments has been described in such a way that the application is applied to an electric power-assist steering system. But, the present invention is not limited to this application to the electric power-assist steering system. The present invention is applicable to other systems that use an electric motor and pressure of the working fluid medium. For example, the present invention is applicable also to such an electrohydraulic system as an air compressor using an electric motor to drive a pump for conveyance of working fluid medium in the form of refrigerant, an electrohydraulic fork lift, a brake system provided with a hydraulic power-assist and a hydraulically activated clutch system.

Accordingly, the embodiments of the present invention provide a system whereby operation of an actuator operable on a working fluid medium is stabilized by the structure wherein an inverter 42 and an electric motor 50 are integrated in such a way that the inverter 42 is in heat transfer communication with the electric motor 50, and fluid passage structure 66 is in heat transfer communication with the inverter (42).

The description of the present invention is merely exemplary in nature and, thus, variations that do not depart from the gist of the present invention are intended to be within the scope of the present invention. Such variations are not to be regarded as a departure from the spirit and scope of the invention.

What is claimed:

1. A working fluid medium temperature control system, comprising:
   a working fluid medium;
   an actuator operable on the working fluid medium;
   a pump for the working fluid medium;
   a fluid passage structure for the working fluid medium;
   an electric motor drivingly connected to the pump; and
   a control unit for the electric motor, the control unit including an inverter and an inverter controller;
   the inverter and the electric motor being integrated in such a way that the inverter is in heat transfer communication with the electric motor,
   the fluid passage structure being in heat transfer communication with the inverter,
   wherein the control unit is configured to adjust the temperature of the working fluid medium by allowing current to pass through coils of the electric motor in such a way that the coils generate heat to raise the temperature of the working fluid medium.

2. The system as claimed in claim 1, further comprising a tank containing the working fluid medium; and a rotating shaft transmitting power from the electric motor to the pump, wherein the inverter and the tank are on the same side of the rotating shaft in its radial direction, and wherein the fluid passage structure is between the inverter and the tank.

3. The system as claimed in claim 1, wherein the fluid passage structure is closer to the inverter and the electric motor than the pump is.

4. The system as claimed in claim 1, wherein the actuator is in the form of a power-assist steering system for a vehicle, wherein the control unit controls the electric motor based on a basic power-assist command by the power-assist steering system, wherein the pump has an intake side and a discharge side, and wherein the fluid passage structure is on one of the intake and discharge sides of the pump and wherein said fluid passage structure is closer to the inverter and the electric motor than the pump is.

5. The system as claimed in claim 1, further comprising a heat storage body including a housing and a heat storage element, and wherein the housing has therein the electric motor, the inverter and the heat storage element, which heat storage element stores heat generated by the electric motor and the inverter, wherein the heat storage element is next to the electric motor and the inverter, wherein the fluid passage structure is in the central part of the housing.

6. The system as claimed in claim 5, further comprising a rotating shaft that transmits power from the electric motor to the pump, and wherein the fluid passage structure extends through an area around the rotating shaft within the housing.

7. The system as claimed in claim 1, further comprising a housing, and wherein the fluid passage structure is close to the inverter with a portion of the housing positioned between the fluid passage structure and the inverter to transfer heat generated by the inverter and the electric motor to the housing and to transfer the heat of the housing to the fluid passage structure.

8. The system as claimed in claim 1, further comprising:
   a vehicle running state detector for detecting a state of running of a vehicle;
   a temperature detector for detecting temperature of the working fluid medium at an outlet of the pump,
   wherein the control unit includes:

a basic-assist command generation unit generating a basic power-assist command based on the detected state of running of the vehicle; and an assisting force command generation unit for generating a torque command for the electric motor and a magnetizing current command for the electric motor based on the basic power-assist command; and wherein, when the control unit finds the detected temperature of the working fluid medium being less than a predetermined temperature threshold and non-steering operation, the assisting force command generation unit generates the torque and magnetizing current commands in such a way that the electric motor generates heat to raise the temperature of the working fluid medium.

9. The system as claimed in claim 1, further comprising:
a vehicle running state detector for detecting a state of running of a vehicle;
a temperature detector for detecting temperature of the working fluid medium at an outlet of the pump,
wherein the control unit includes:
   a basic-assist command generation unit generating a basic power-assist command based on the detected state of running of the vehicle; and
   an assisting force command generation unit for generating a torque current command for the electric motor and a magnetizing current command for the electric motor based on the basic power-assist command; and
wherein, when the control unit finds non-steering operation, the assisting force command generation unit determines a temperature control range based on the value of the temperature of the working fluid medium detected after lapse of a predetermined time threshold from startup of running of the vehicle and generates the torque and magnetizing current commands in such a way that the electric motor generates heat to raise the temperature of the working fluid medium to keep the temperature of the working fluid medium within the temperature control range.

10. The system as claimed in claim 1, further comprising:
a vehicle running state detector for detecting a state of running of a vehicle;
a temperature detector for detecting temperature of the working fluid medium at an outlet of the pump,
wherein the control unit includes:
   a basic-assist command generation unit generating a basic power-assist command based on the detected state of running of the vehicle; and
   an assisting force command generation unit generating a torque current command for the electric motor and a magnetizing current command for the electric motor based on the basic power-assist command; and
wherein, when the control unit finds non-steering operation or state of steering operation in which steering input is less than a predetermined threshold, the assisting force command generation unit determines a temperature control range based on the value of the temperature of the working fluid medium detected after lapse of a predetermined time threshold from startup of running of the vehicle and generates the torque and magnetizing current commands when the detected temperature is not greater than an upper limit in such a way that the electric motor generates heat to raise the temperature of the working fluid medium to keep the temperature of the working fluid medium within the temperature control range.

11. The system as claimed in claim 1, wherein the control unit has plural sets of maps including a first set of maps for adjustment of the temperature of the working fluid medium and a second set of maps not for adjustment of the temperature of the working fluid medium, and wherein the control unit selects maps out of the plural sets of maps and an assisting force command generation unit uses the selected maps to determine current commands for the electric motor to generate heat.

12. The system as claimed in claim 1, wherein the inverter and the electric motor are next to each other and the fluid passage structure is close to the inverter.

13. A working fluid medium temperature control method for a system including: an actuator operable on a working fluid medium; a pump for the working fluid medium; a fluid passage structure for the working fluid medium; an electric motor drivingly connected to the pump; and a control unit for the electric motor, the control unit including an inverter and an inverter controller, the method comprising:
   activating the inverter to cause the electric motor to generate heat by allowing current to pass through coils of the electric motor;
   transferring heat generated by the electric motor and heat of the inverter to the working fluid medium passing through the fluid passage structure to raise the temperature of the working fluid medium; and
   controlling generation of heat by the electric motor to keep the temperature of the working fluid medium within a temperature control range.

* * * * *